US012801732B2

(12) United States Patent
Hooten et al.

(10) Patent No.: US 12,801,732 B2
(45) Date of Patent: Nov. 17, 2026

(54) DEVICES, SYSTEMS, AND METHODS FOR UTILIZING A NETWORKED, COMPUTER-ASSISTED, THREAT HUNTING PLATFORM TO ENHANCE NETWORK SECURITY

(71) Applicant: BlueVoyant LLC, New York, NY (US)

(72) Inventors: Lucas Hooten, New York, NY (US); Stoney DeVille, New York, NY (US); Ryan Moon, New York, NY (US); Michael Scutt, New York, NY (US); Ben Nelson, New York, NY (US)

(73) Assignee: BlueVoyant LLC, New York, NY (US)

( * ) Notice: Subject to any disclaimer, the term of this patent is extended or adjusted under 35 U.S.C. 154(b) by 0 days.

(21) Appl. No.: 18/880,965

(22) PCT Filed: Jul. 14, 2023

(86) PCT No.: PCT/US2023/070239

§ 371 (c)(1),
(2) Date: Jan. 3, 2025

(87) PCT Pub. No.: WO2024/015980

PCT Pub. Date: Jan. 18, 2024

(65) Prior Publication Data

US 2025/0384127 A1 Dec. 18, 2025

Related U.S. Application Data

(60) Provisional application No. 63/368,567, filed on Jul. 15, 2022.

(51) Int. Cl.
*G06F 21/00* (2013.01)
*G06F 21/55* (2013.01)
*G06F 21/62* (2013.01)

(52) U.S. Cl.
CPC ........ *G06F 21/554* (2013.01); *G06F 21/6227* (2013.01)

(58) Field of Classification Search
CPC ........................... G06F 21/554; G06F 21/6227
See application file for complete search history.

(56) References Cited

U.S. PATENT DOCUMENTS 6,487,552 B1 11/2002 Lei et al.
10,631,168 B2 * 4/2020 Chari .................... H04W 12/12
(Continued)

FOREIGN PATENT DOCUMENTS

WO 2024015980 A1 1/2024

OTHER PUBLICATIONS

International Search Report and Written Opinion for corresponding International Application No. PCT/US2023/070239, mailed Oct. 30, 2023.

(Continued)

*Primary Examiner* — Don G Zhao
(74) *Attorney, Agent, or Firm* — K&L Gates LLP

(57) ABSTRACT

Systems and methods for a threat-hunting development environment are disclosed herein. The systems and methods can include: executing a networked, assisted, threat-hunting environment that, via a dedicated user interface, is configured to establish data transfer pipelines between the threat-hunting environment and the at least one tenant network, the data transfer pipelines maintaining a connection between the threat-hunting environment and the at least one tenant network during an active session, via the at least one SIEM server, to allow continuous data communication; query the at least one tenant network with a query developed via an integrated code editor; receive the query result data from the at least one tenant network: analyze, the result data for a detected threat in the at least one tenant network; and based (Continued)

on the analyzed result data, push a subsequent query to the at least one tenant network to respond to detected threat.

15 Claims, 13 Drawing Sheets

(56) References Cited

U.S. PATENT DOCUMENTS

| | | | | |
|---|---|---|---|---|
| 10,999,164 | B1 * | 5/2021 | Sridhar | H04L 41/20 |
| 11,240,110 | B1 * | 2/2022 | Narula | H04L 41/5064 |
| 11,321,462 | B2 * | 5/2022 | Jaenisch | G06F 21/566 |
| 11,341,235 | B2 * | 5/2022 | Jaenisch | G06F 21/54 |
| 11,372,871 | B1 * | 6/2022 | Tracey | G06F 16/2477 |
| 11,615,185 | B2 * | 3/2023 | Lee | G06F 21/6218 726/23 |
| 11,888,870 | B2 * | 1/2024 | Garyani | G06F 21/554 |
| 11,902,306 | B1 * | 2/2024 | Satish | H04L 63/1425 |
| 12,079,331 | B2 * | 9/2024 | Murphy | H04L 63/1433 |
| 12,197,578 | B1 * | 1/2025 | Brandwine | G06F 21/554 |
| 12,235,954 | B2 * | 2/2025 | Kutner | G06F 3/0652 |
| 12,375,502 | B2 * | 7/2025 | Loomis | H04L 63/02 |
| 2010/0332472 | A1 | 12/2010 | Graefe et al. | |
| 2014/0344459 | A1 * | 11/2014 | Kludy | H04L 41/122 709/226 |
| 2016/0063107 | A1 | 3/2016 | Schukovets et al. | |
| 2018/0004942 | A1 * | 1/2018 | Martin | G06F 21/554 |
| 2018/0103065 | A1 * | 4/2018 | Graham | H04L 63/08 |
| 2018/0159856 | A1 * | 6/2018 | Gujarathi | H04L 63/0281 |
| 2018/0293378 | A1 * | 10/2018 | Lango | G06F 21/53 |
| 2018/0365299 | A1 | 12/2018 | Bruce et al. | |
| 2019/0050561 | A1 * | 2/2019 | Li | G06F 21/552 |
| 2019/0104140 | A1 * | 4/2019 | Gordeychik | H04L 63/1433 |
| 2020/0186569 | A1 * | 6/2020 | Milazzo | H04L 63/08 |
| 2020/0259847 | A1 * | 8/2020 | Loomis | H04L 63/0227 |
| 2020/0374305 | A1 | 11/2020 | Kursun | |
| 2021/0006573 | A1 * | 1/2021 | Britt | G06F 21/31 |
| 2021/0297427 | A1 * | 9/2021 | Narula | G06F 3/048 |
| 2021/0306352 | A1 * | 9/2021 | Narula | G06N 5/04 |
| 2022/0294816 | A1 * | 9/2022 | Martin | H04L 67/535 |
| 2022/0345483 | A1 * | 10/2022 | Shua | H04L 9/0825 |
| 2022/0360594 | A1 * | 11/2022 | Cosgrove | H04L 63/1416 |
| 2022/0417264 | A1 * | 12/2022 | Moon | H04L 63/104 |
| 2023/0123509 | A1 * | 4/2023 | Wolf | G06F 21/577 714/45 |
| 2024/0062133 | A1 * | 2/2024 | Saxe | H04L 63/1425 |
| 2024/0323202 | A1 * | 9/2024 | Niv | H04L 63/1441 |
| 2025/0148014 | A1 * | 5/2025 | Niv | G06N 7/01 |

OTHER PUBLICATIONS

Kim, Cybersecurity in the Age of the Cloud, Feb. 19, 2020; https://www.sans.org/media/cloud-security/eBook_cloud-security.pdf?msc=cloudsecuritylp.

Sousa, Machine Learning to Improve Security Operations Centers, Jun. 30, 2022; https://recipp.ipp.ptlbitstream/10400.22/20733/1/DM_NorbertoSousa_2022_MEIA.pdf.

Extended European Search Report for corresponding European Application No. 23840572.4 mailed Mar. 12, 2026.

* cited by examiner

DEVICES, SYSTEMS, AND METHODS FOR UTILIZING A NETWORKED, COMPUTER-ASSISTED, THREAT HUNTING PLATFORM TO ENHANCE NETWORK SECURITY

CROSS-REFERENCE TO RELATED APPLICATIONS

This application is a U.S. National Stage Entry under 35 U.S.C. § 371 of International Patent Application No. PCT/US2023/070239, filed Jul. 14, 2023 titled "DEVICES, SYSTEMS, AND METHODS FOR UTILIZING A NETWORKED, COMPUTER-ASSISTED, THREAT HUNTING PLATFORM TO ENHANCE NETWORK SECURITY", which claims the benefit of, and priority from U.S. provisional application No. 63/368,567, filed on Jul. 15, 2022, titled "DEVICES, SYSTEMS, AND METHODS FOR UTILIZING A NETWORKED, COMPUTER-ASSISTED, THREAT HUNTING PLATFORM TO ENHANCE NETWORK SECURITY" the disclosures of which are incorporated by reference in their entirety herein.

FIELD

The present technology pertains to systems and methods for a networked, connected integrated security management environment. In particular, but not by way of limitation, the present technology provides a Networked Computer Assisted Unified Threat Hunting Platform.

SUMMARY

In some embodiments the present technology is directed to an assisted and networked threat hunting detection and response system, the system comprising at least one SIEM server connected to at least one tenant network; a SOAR management server connected to the SIEM servers, the SOAR management server with an at least one memory coupled to an at least one processor, where the memory is loaded with instructions, the at least one processor coupled to the at least one memory configured to execute a threat-hunting environment that, via a dedicated user interface, is configured to: establish data transfer pipelines between the threat-hunting environment and the at least one tenant network, the data transfer pipelines maintaining a connection between the threat-hunting environment and the at least one tenant network during an active session, via the at least one SIEM server, to allow continuous data communication; query the at least one tenant network with a query developed via an integrated code editor; receive the query result data from the at least one tenant network; analyze, the result data for a detected threat in the at least one tenant network; and based on the analyzed result data, push a subsequent query to the at least one tenant network to respond to detected threat. In various embodiments, the threat-hunting environment is further configured to: save the query or the subsequent query for future use and reference.

BRIEF DESCRIPTION OF THE DRAWINGS

In the description, for purposes of explanation and not limitation, specific details are set forth, such as particular embodiments, procedures, techniques, etc. to provide a thorough understanding of the present technology. However, it will be apparent to one skilled in the art that the present technology may be practiced in other embodiments that depart from these specific details.

The accompanying drawings, where like reference numerals refer to identical or functionally similar elements throughout the separate views, together with the detailed description below, are incorporated in and form part of the specification, and serve to further illustrate embodiments of concepts that include the claimed disclosure and explain various principles and advantages of those embodiments.

Figure 1:
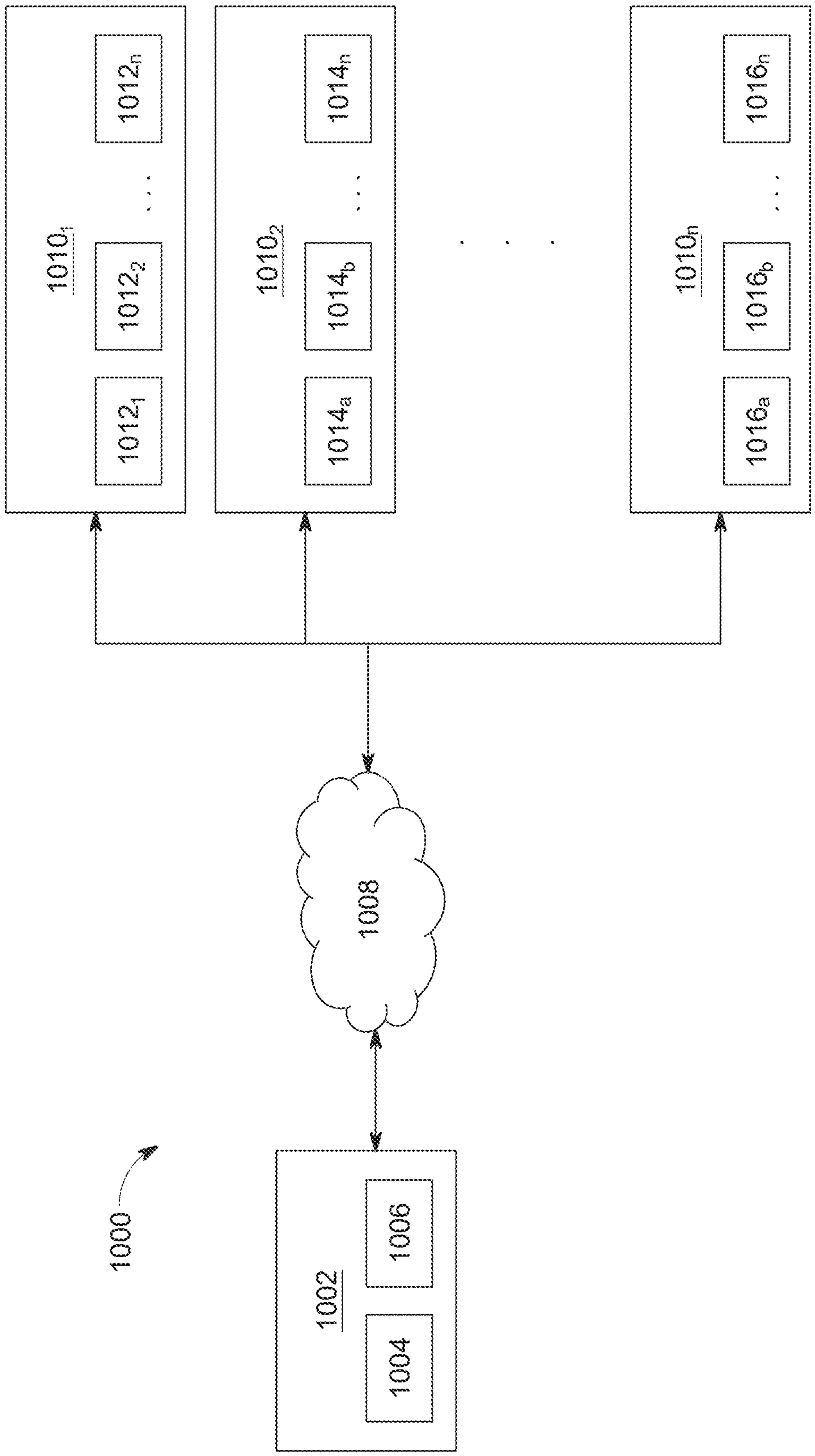

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Figure 2:
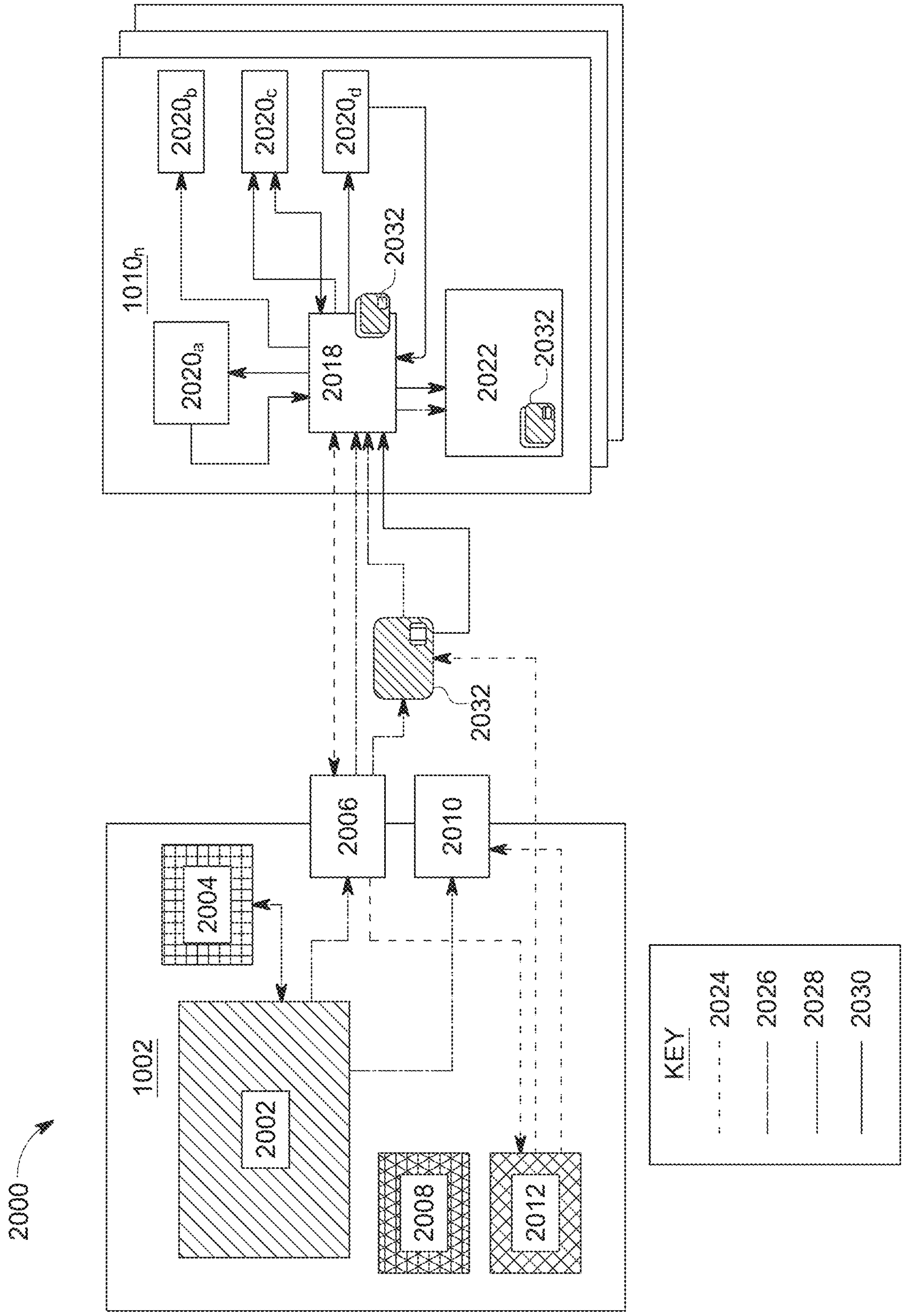
Figure 3:
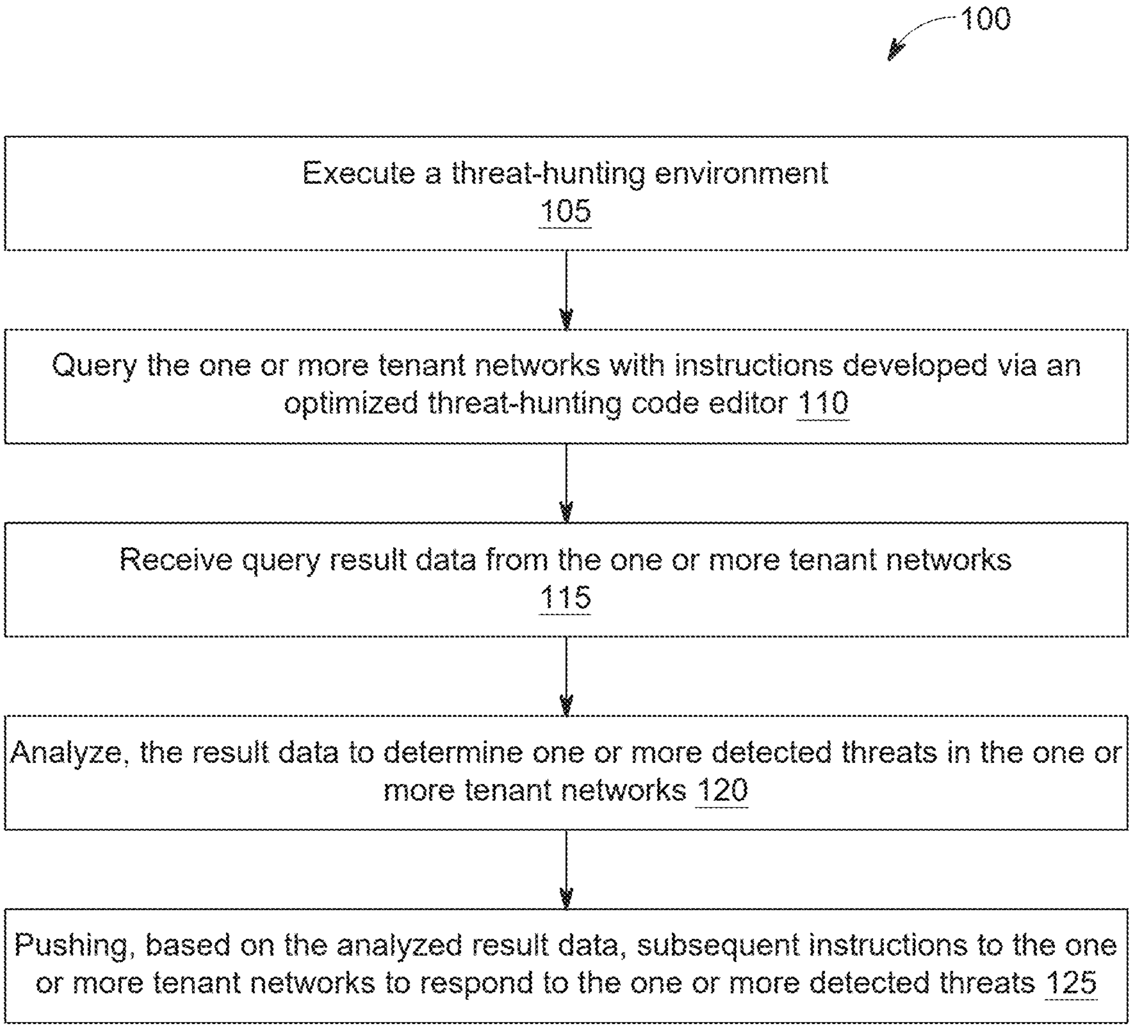
Figure 4A:
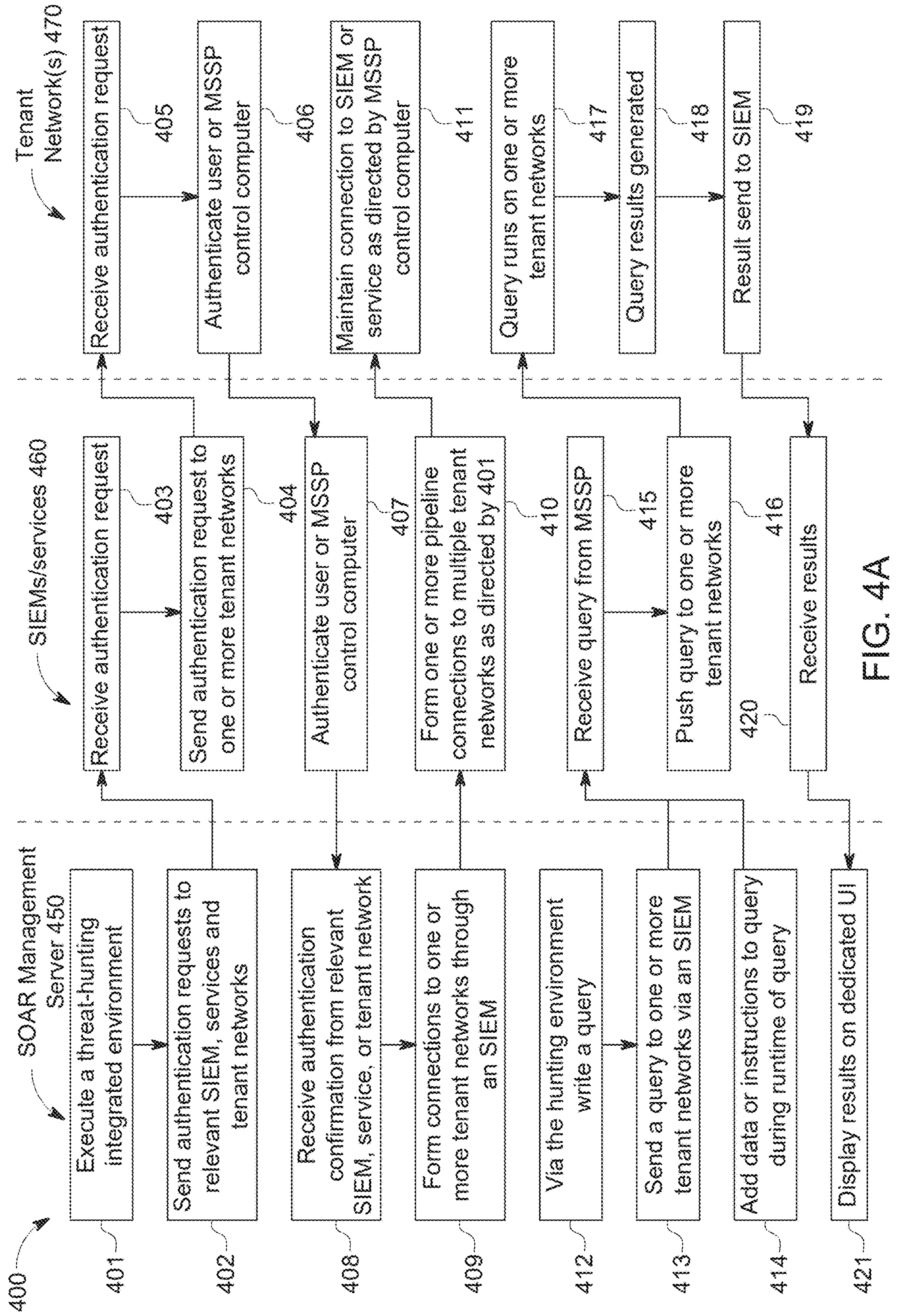
Figure 4B:
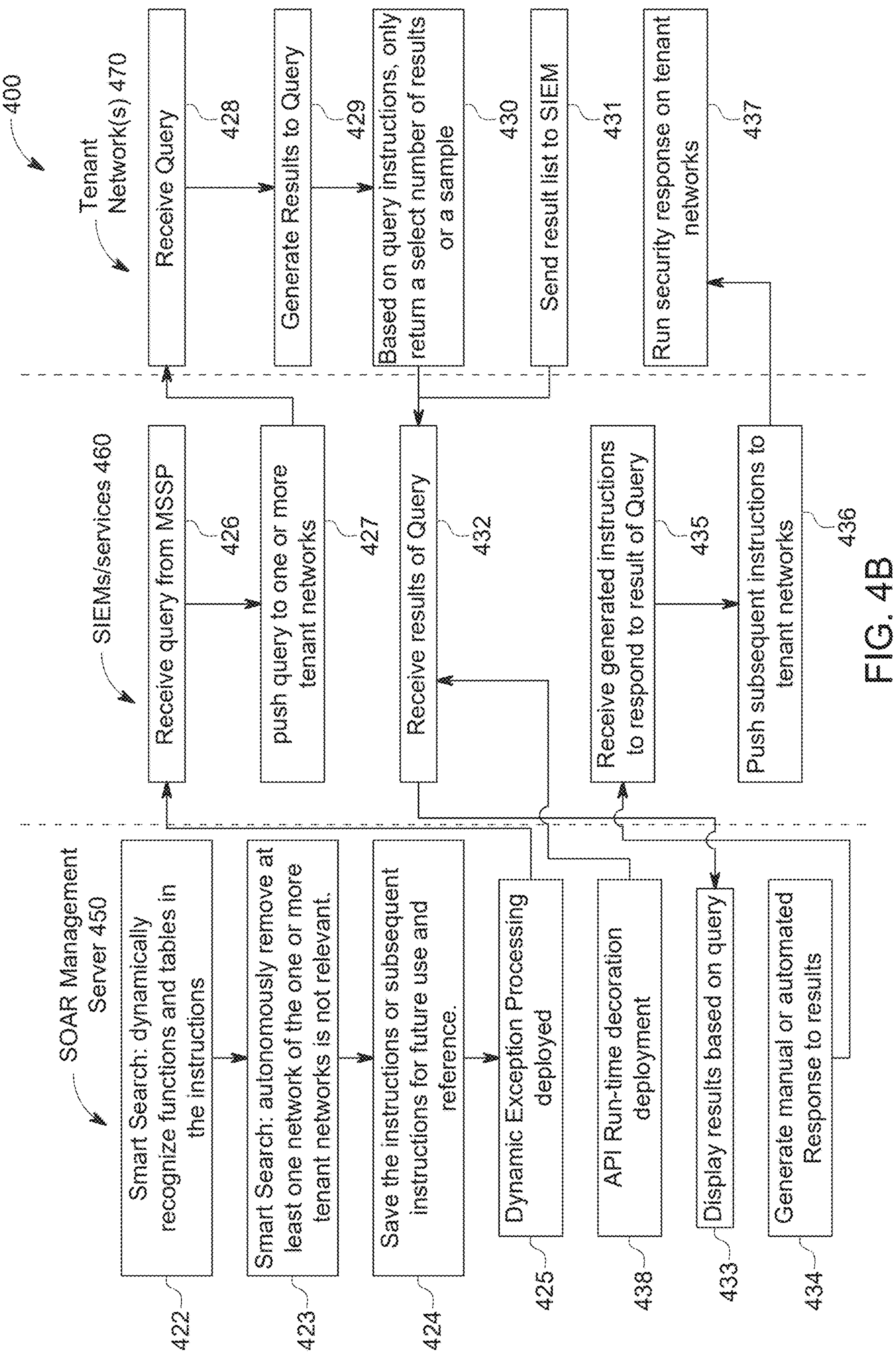
Figure 5:
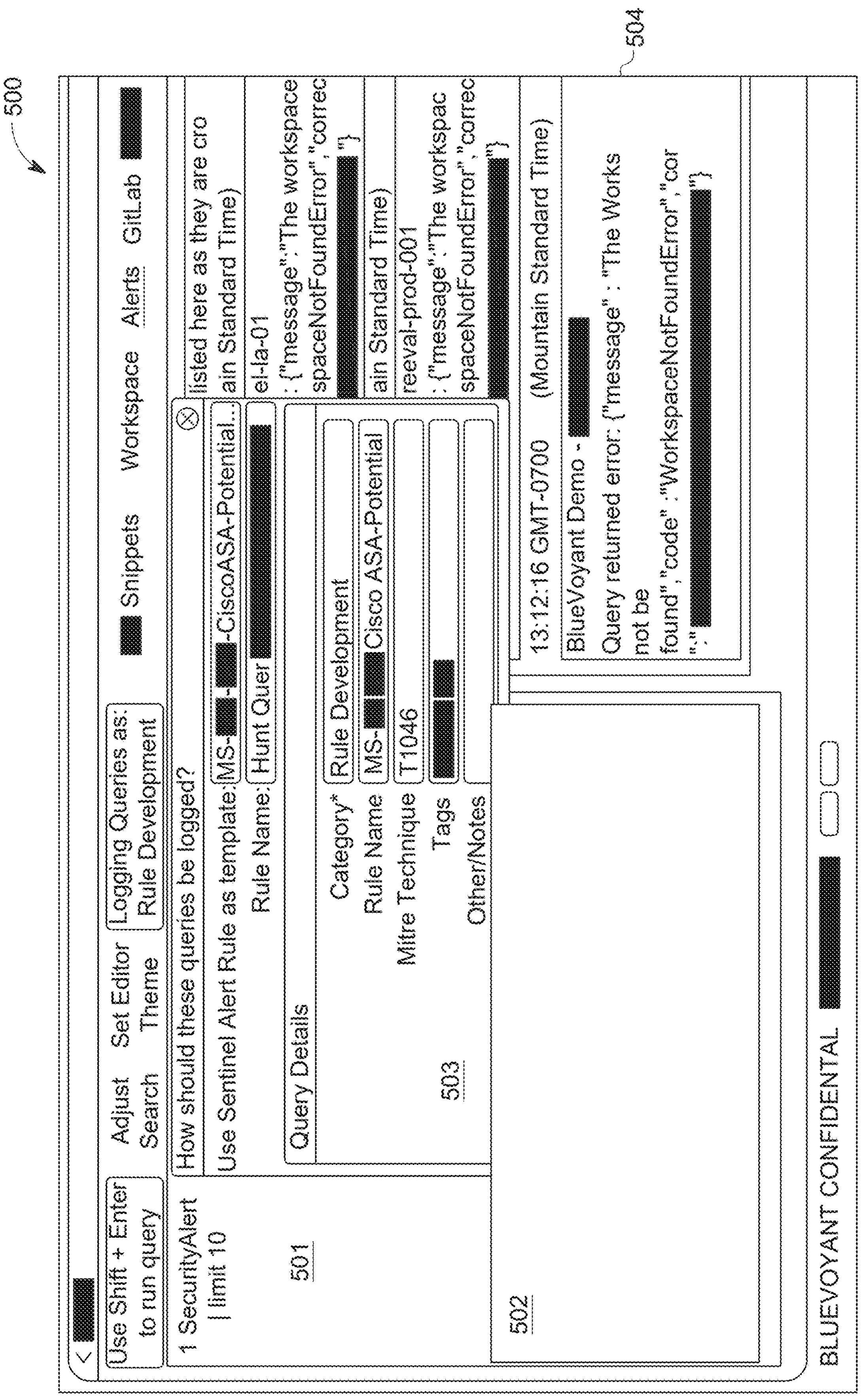
Figure 6:
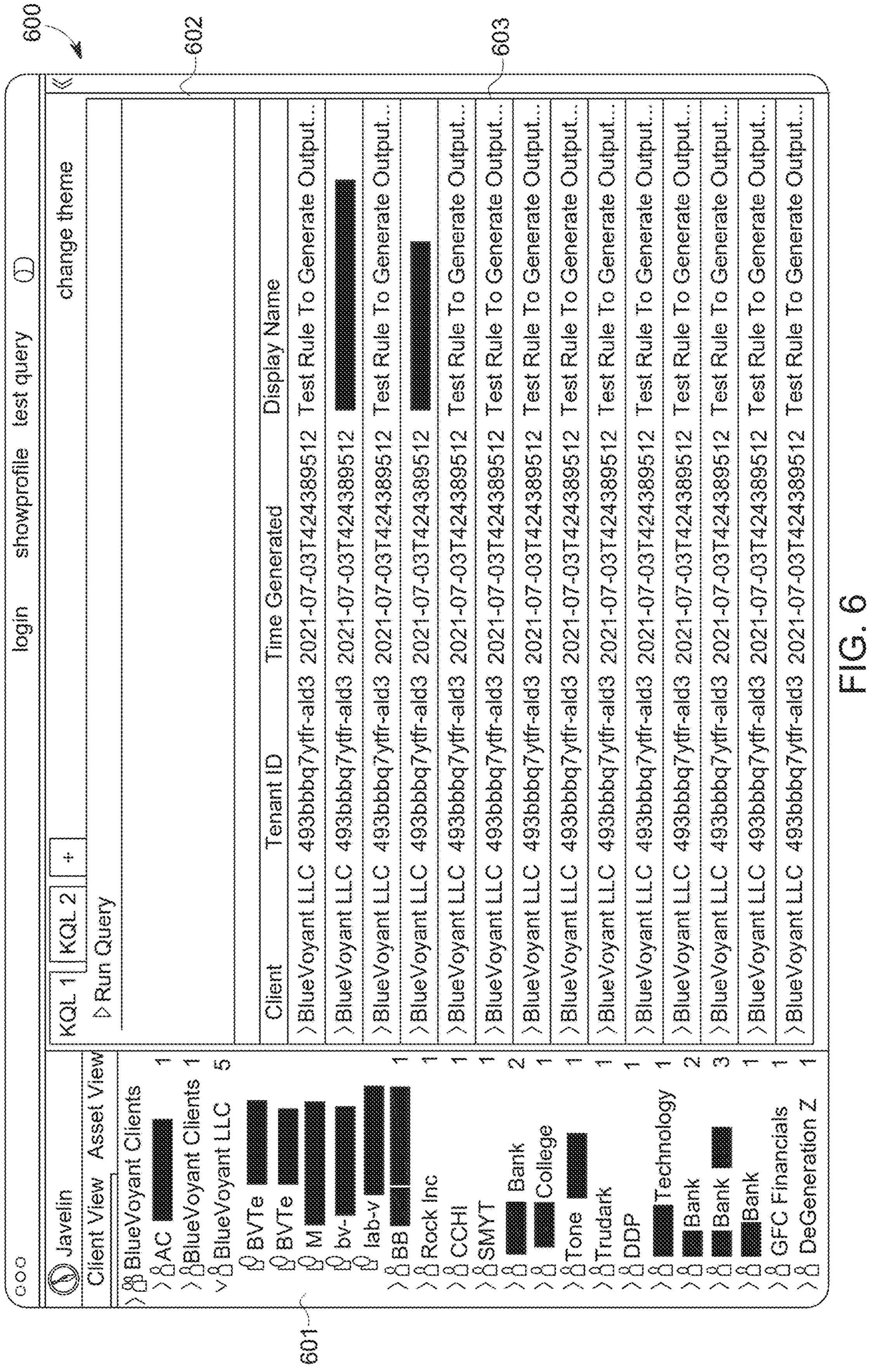
Figure 7:
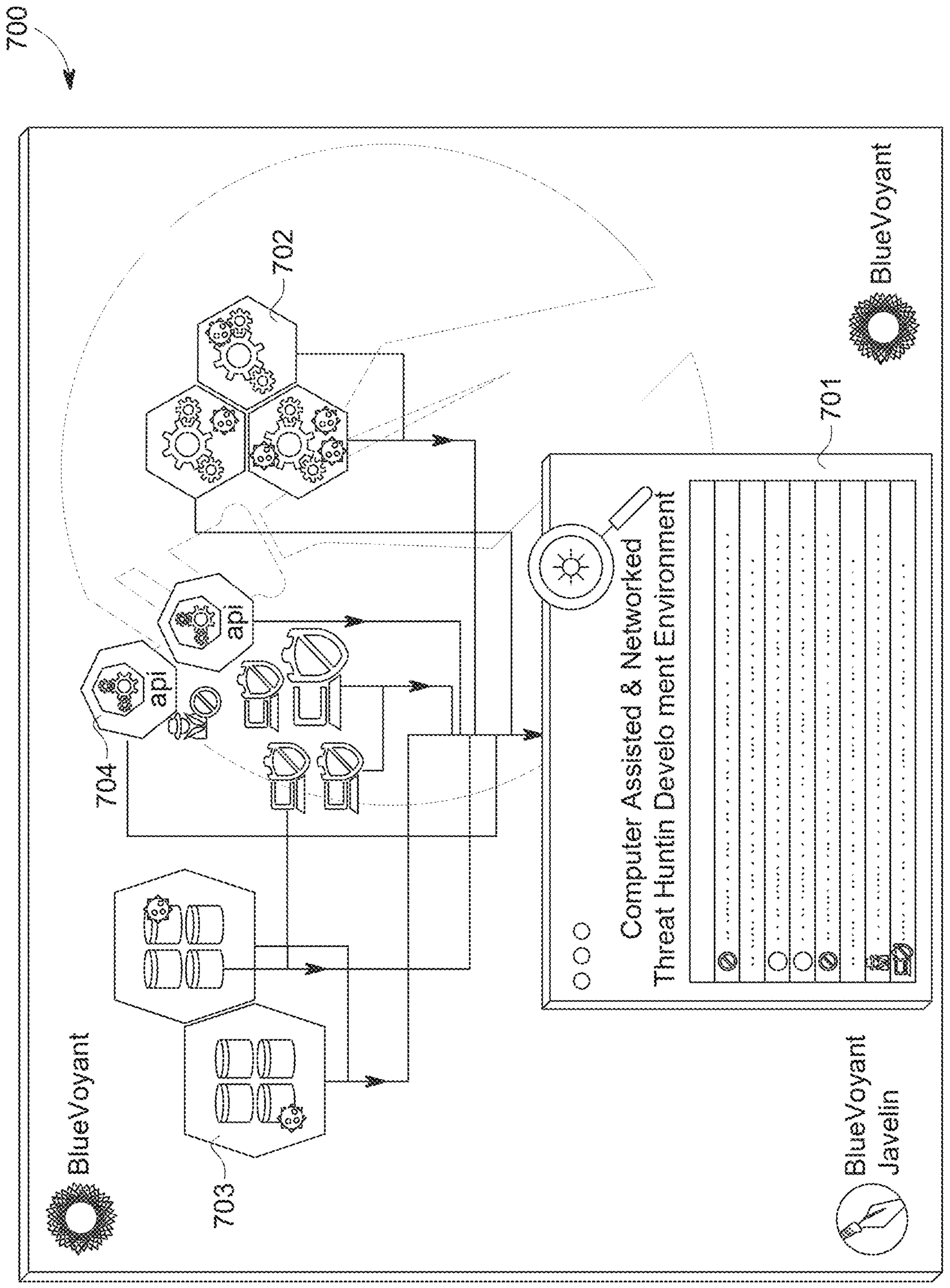
Figure 8A:
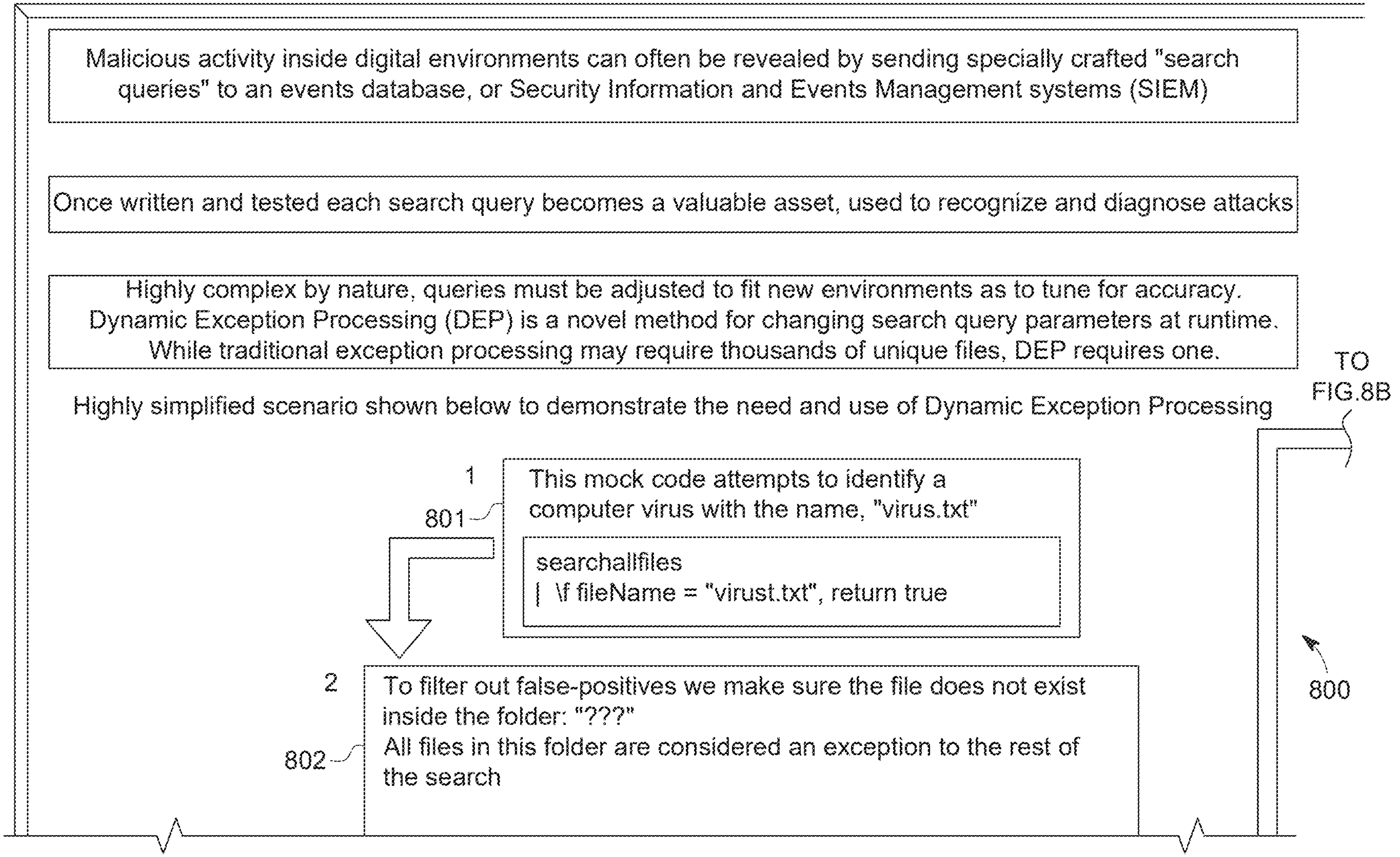
Figure 8A:
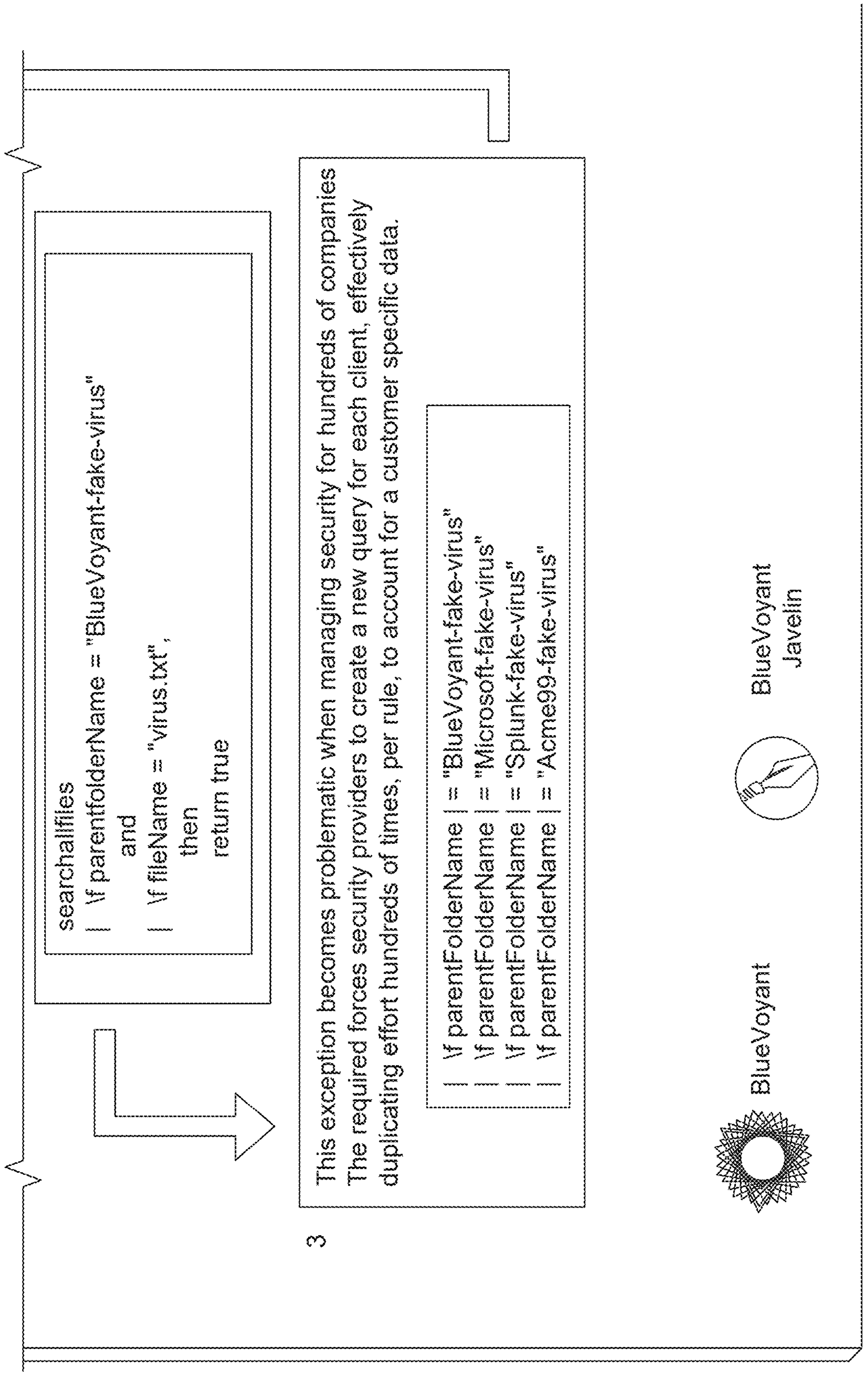
Figure 8B:
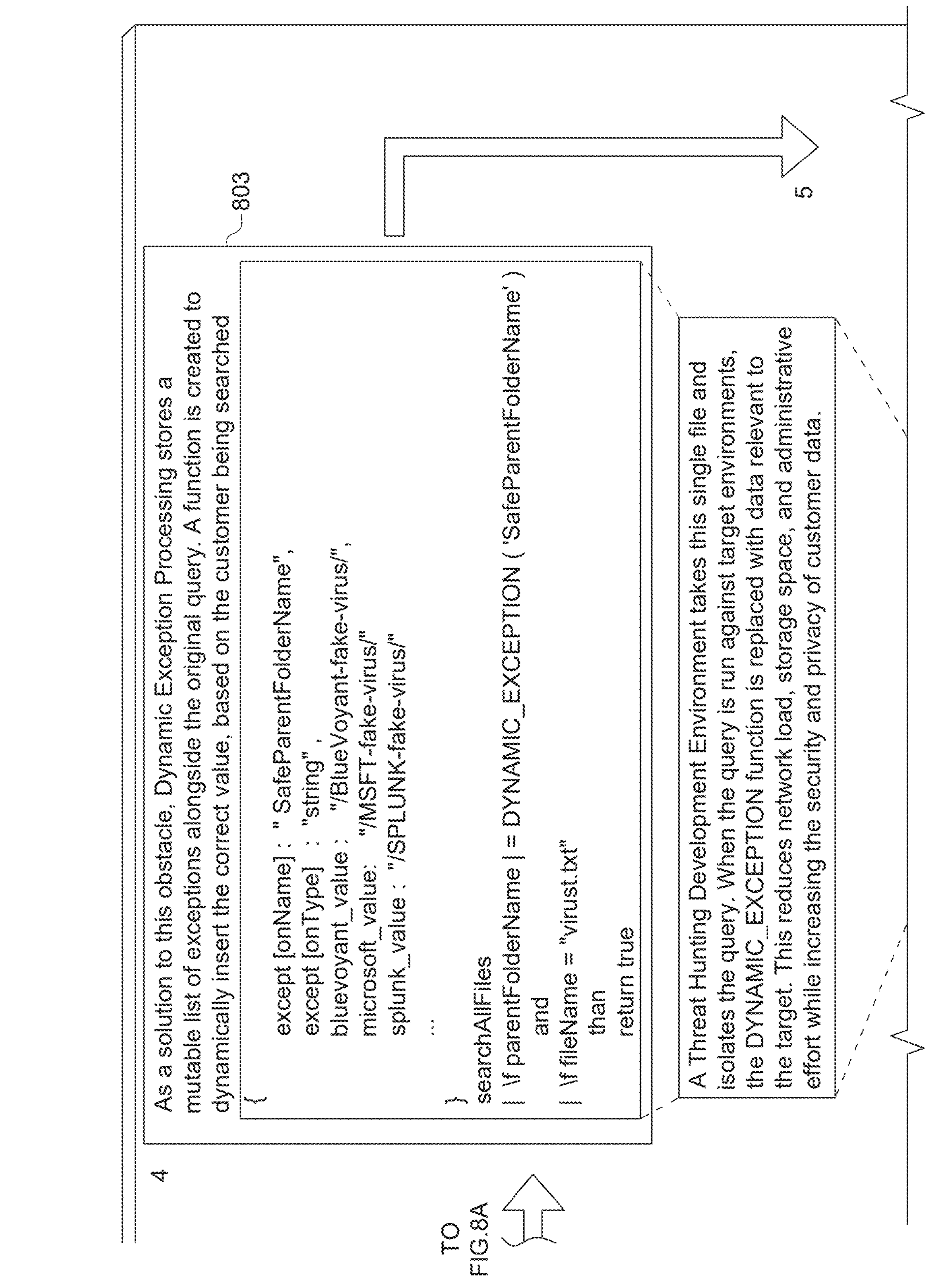
Figure 8B:
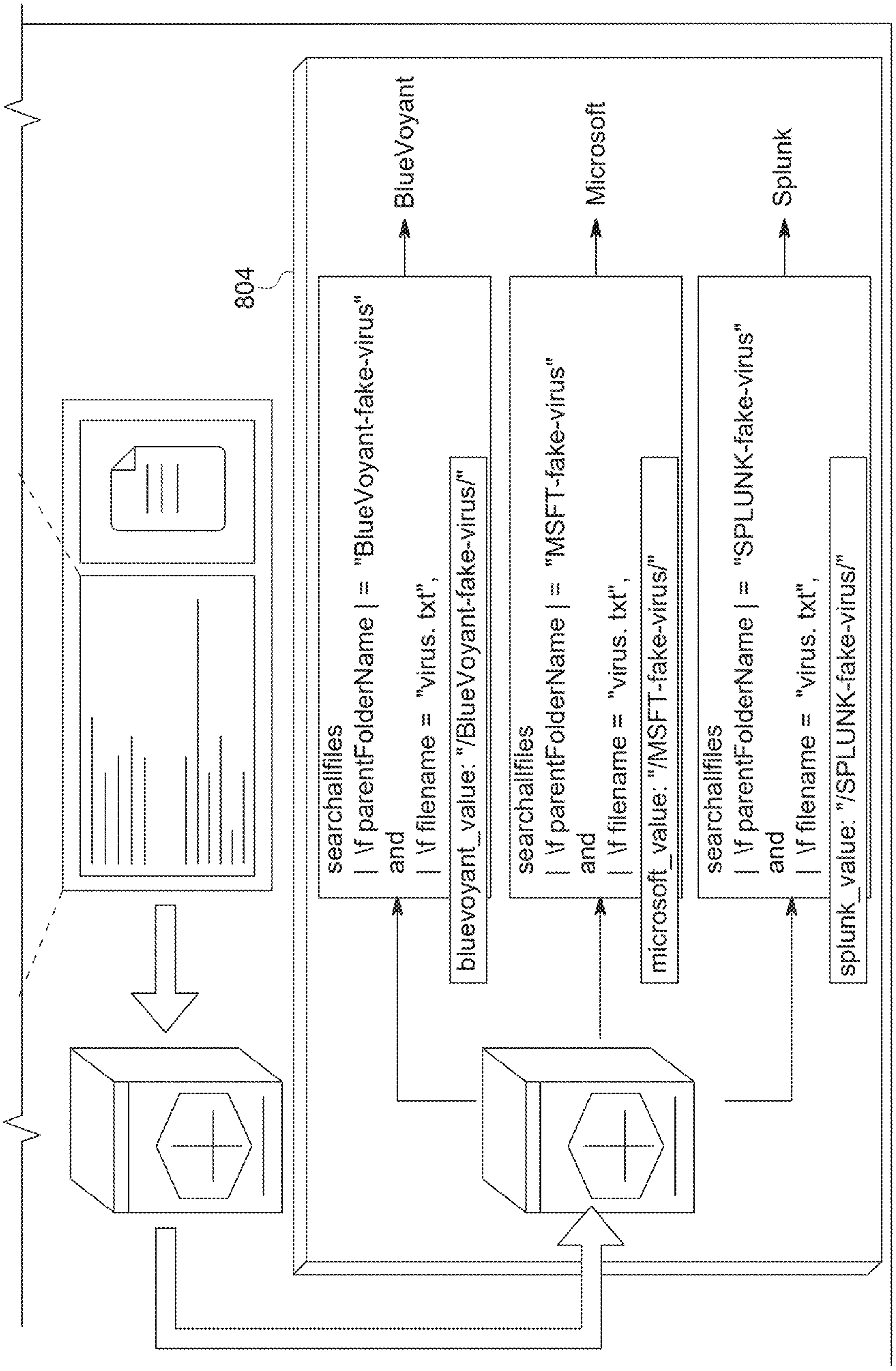
Figure 9:
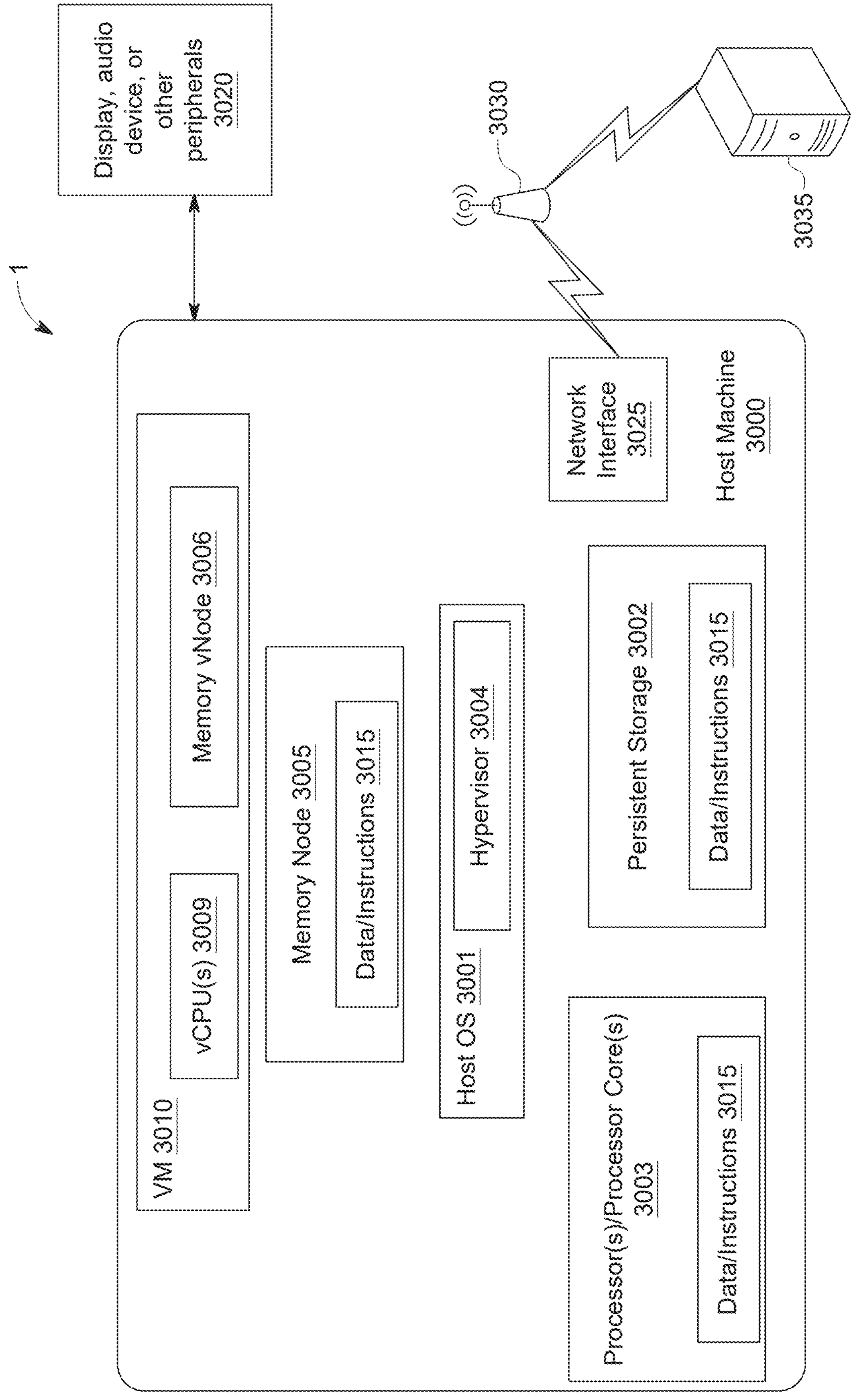

FIG. 1 illustrates a system configured to remotely manage another organization's Security Orchestration, Automation, and Response (SOAR), in accordance with at least one non-limiting aspect of the present disclosure;

FIG. 2 illustrates a functional architecture of the system of FIG. 1, in accordance with at least one non-limiting aspect of the present disclosure;

FIG. 3 illustrates a method for security enhancement of a tenant network via an integrated threat-hunting environment, in accordance with at least one non-limiting aspect of the present disclosure;

FIGS. 4A and 4B illustrate relationships between various participants in an integrated threat-hunting environment, in accordance with at least one non-limiting aspect of the present disclosure;

FIG. 5 illustrates a user interface (UI) configured for us via the integrated threat-hunting environment of FIG. 3, in accordance with at least one non-limiting aspect of the present disclosure;

FIG. 6 illustrates another UI for the integrated threat-hunting environment of FIG. 3, in accordance with at least one non-limiting aspect of the present disclosure;

FIG. 7 illustrates a system diagram of a threat hunting environment and its various connect networks and services, in accordance with at least one non-limiting aspect of the present disclosure;

FIG. 8A-8B illustrate a method of Dynamic Exception Processing (DEP) and how it is incorporated by an integrated threat-hunting environment, in accordance with at least one non-limiting aspect of the present disclosure; and FIG. 9 illustrates a system diagram of an integrated threat-hunting environment, in accordance with at least one non-limiting aspect of the present disclosure.

DETAILED DESCRIPTION

The Applicant of the present application owns the following U.S. Provisional Patent Applications, the disclosure of each of which is herein incorporated by reference in its entirety:

- International Patent Application No. PCT/US2022/072739, titled DEVICES, SYSTEMS, AND METHODS FOR ENHANCING SECURITY INFORMATION & EVENT MANAGEMENT UPDATES FOR MULTIPLE TENANTS BASED ON CORRELATED, AND SYNERGISTIC DEPLOYMENT NEEDS, filed on Jun. 3, 2022;
- International Patent Application No. PCT/US2022/072743, titled DEVICES, SYSTEMS, AND METHODS FOR STANDARDIZING & STREAMLINING THE DEPLOYMENT OF SECURITY INFORMA- TION & EVENT MANAGEMENT ARTIFACTS FOR MULTIPLE TENANTS, filed on Jun. 3, 2022;

International Patent Application No. PCT/US2022/082167, titled DEVICES, SYSTEMS, AND METHODS FOR PROVISIONING AND UPDATING SECURITY INFORMATION & EVENT MANAGEMENT ARTIFACTS FOR MULTIPLE TENANTS, filed on Dec. 21, 2022;

International Patent Application No. PCT/US2022/082173, titled DEVICES, SYSTEMS, AND METHODS FOR STREAMLINING AND STANDARDIZING THE INGEST OF SECURITY DATA ACROSS MULTIPLE TENANTS, filed on Dec. 21, 2022;

International Patent Application No. PCT/US2023/061069, titled DEVICES, SYSTEMS, AND METHODS FOR REMOTELY MANAGING ANOTHER ORGANIZATION'S SECURITY ORCHESTRATION, AUTOMATION, AND RESPONSE, filed on Jan. 23, 2023;

International Patent Application No. PCT/US2023/062894, titled DEVICES, SYSTEMS, AND METHODS FOR IDENTIFYING CYBER ASSETS AND GENERATING CYBER RISK MITIGATION ACTION BASED ON DOMAIN REDIRECTS, filed on Feb. 20, 2023;

International Patent Application No. PCT/US2023/021736, titled DEVICES, SYSTEMS, AND METHODS FOR SUMMARIZING ANALYTIC OBSERVATIONS, filed on May 10, 2023;

International Patent Application No. PCT/US2023/022858, titled DEVICES, SYSTEMS, AND METHODS FOR INGESTING & ENRICHING SECURITY INFORMATION TO AUTONOMOUSLY SECURE A PLURALITY OF TENANT NETWORKS, filed on May 19, 2023;

International Patent Application No. PCT/US2023/022535, titled DEVICES, SYSTEMS, AND METHODS FOR IDENTIFYING CYBER ASSETS AND GENERATING CYBER RISK MITIGATION ACTIONS BASED ON A DEMOCRATIC MATCHING ALGORITHM, filed on May 17, 2023;

International Patent Application No. PCT/US2023/024386, titled DEVICES, METHODS, AND SYSTEMS FOR GENERATING A HIGHLY-SCALABLE, EFFICIENT COMPOSITE RECORD INDEX, filed on Jun. 4, 2023;

International Patent Application No. PCT/US2023/068590, titled DEVICES, SYSTEMS, AND METHODS FOR CATEGORIZING, PRIORITIZING, AND MITIGATING CYBER SECURITY RISKS, filed on Jun. 16, 2023;

U.S. Provisional Patent Application No. 63/368,567 titled DEVICES, SYSTEMS, AND METHODS FOR UTILIZING A NETWORKED, COMPUTER-ASSISTED, THREAT HUNTING PLATFORM TO ENHANCE NETWORK SECURITY, filed on Jul. 17, 2022;

U.S. Provisional Patent Application No. 63/369,582 titled AUTONOMOUS THREAT SCORING AND SECURITY ENHANCEMENT, filed on Jul. 27, 2022;

U.S. Provisional Patent Application No. 63/377,304 titled DEVICES, SYSTEMS, AND METHODS FOR CONTINUOUSLY ENHANCING THE IMPLEMENTATION OF CODE CHANGES VIA ENRICHED PIPELINES, filed on Sep. 27, 2022; and U.S. Provisional Patent Application No. 63/507,250 titled DEVICES, SYSTEMS, AND METHODS FOR ATTRIBUTING NETWORK-IMPLEMENTED CYBER ASSETS TO OPERATING ENTITIES AND GENERATING CYBER RISK MITIGATION ACTIONS BASED ON THE ATTRIBUTION, filed on Jun. 9, 2023.

Numerous specific details are set forth to provide a thorough understanding of the overall structure, function, manufacture, and use of the aspects as described in the disclosure, and illustrated in the accompanying drawings. Well-known operations, components, and elements have not been described in detail so as not to obscure the aspects described in the specification. The reader will understand that the aspects described, and illustrated herein are non-limiting aspects, and thus it can be appreciated that the specific structural, and functional details disclosed herein may be representative, and illustrative. Variations, and changes thereto may be made without departing from the scope of the claims. Furthermore, it is to be understood that such terms as "forward", "rearward", "left", "right", "upwardly", "downwardly", and the like are words of convenience, and are not to be construed as limiting terms.

In the following description, like reference characters designate like or corresponding parts throughout the several views of the drawings. Also in the following description, it is to be understood that such terms as "forward", "rearward", "left", "right", "upwardly", "downwardly", and the like are words of convenience, and are not to be construed as limiting terms.

Before explaining various aspects of the systems, and methods disclosed herein in detail, it should be noted that the illustrative aspects are not limited in application or use to the details of disclosed in the accompanying drawings, and description. It shall be appreciated that the illustrative aspects may be implemented or incorporated in other aspects, variations, and modifications, and may be practiced or carried out in various ways. Further, unless otherwise indicated, the terms, and expressions employed herein have been chosen for the purpose of describing the illustrative aspects for the convenience of the reader, and are not for the purpose of limitation thereof. For example, it shall be appreciated that any reference to a specific manufacturer, software suite, application, or development platform disclosed herein is merely intended to illustrate several of the many aspects of the present disclosure. This includes any, and all references to trademarks. Accordingly, it shall be appreciated that the devices, systems, and methods disclosed herein can be implemented to enhance any software update, in accordance with any intended use, and/or user preference.

As used herein, the term "server" may refer to or include one or more computing devices that are operated by or facilitate communication, and processing for multiple parties in a network environment, such as the Internet or any public or private network. Reference to "a server" or "a processor," as used herein, may refer to a previously-recited server, and/or processor that are recited as performing a previous step or function, a different server, and/or processor, and/or a combination of servers, and/or processors.

As used herein, the term "platform" shall include software and/or an ecosystem of physical resources required to enable the technological benefits provided by software. For example, a platform can include either a stand-alone software product, or a software product configured to integrate with other software or physical resources within the ecosystem required for the software to provide its technological benefit. According to some non-limiting aspects, the technological benefit provided by the software is provided to the physical resources of the ecosystem or other software employed by physical resources within the ecosystem (e.g., APIs, services, etc.). According to other non-limiting aspects, a platform can include a framework of several software applications intended and designed to work together.

As used herein, the term "network" shall include an entire enterprise information technology ("IT") system, a tenant "network" applies this term to a client of a managed security service provider (MSSP) for which the MSSP is providing Security Information, and Event Management (SIEM) services. For example, a network can include a group of two or more nodes (e.g., devices) connected by any physical and/or wireless connection and configured to communicate and share information with the other node or nodes. However, the term network shall not be limited to any particular nodes or any particular means of connecting those nodes. A network can include any combination of devices (e.g., servers, databases, local or cloud storage, desktop computers, laptop computers, personal digital assistants, mobile phones, wearables, smart appliances, etc.) configured to connect to an Ethernet, intranet, and/or extranet and communicate with one another via an ad hoc connection (e.g., Bluetooth®, near field communication ("NFC"), etc.), a local area connection ("LAN"), a wireless local area network ("WLAN"), and/or a virtual private network ("VPN"), regardless of each devices' physical location. A network can further include any tools, applications, and/or services deployed by devices, or otherwise utilized by an enterprise IT system, such as a firewall, an email client, document management systems, office systems, etc. In some non-limiting aspects, a "network" can include third-party devices, applications, and/or services that, although they are owned and controlled by a third party, are authorized by a tenant to access the enterprise IT system.

Security Information, and Event Management (SIEM) includes software configured to aggregate and analyze activity from many different resources across an entire information technology (IT) infrastructure. For example, SIEM can be utilized by SIEM service providers also known as Managed Security Service Providers (MSSP) to aggregate data (e.g., logging data, event data, threat intelligence data, etc.) from multiple systems, and analyze that data to catch abnormal behavior or potential cyberattacks. For example, SIEM may collect security data from network devices, servers, domain controllers, and more. SIEM can be implemented to store, normalize, aggregate, and apply analytics to that data to discover trends, detect threats, and enable organizations to investigate any alerts.

Examples of commonly implemented SIEMs include Azure Sentinel and Splunk Cloud, Devo, LogRhythm, IBM's QRadar, Securonix, McAfee Enterprise Security Manager, LogPoint, Elastic Stack, ArcSight Enterprise Security Manager, InsightIDR, amongst others. Deploying Azure Sentinel as a cloud-based tool, specifically, has become a popular choice amongst managed security service providers ("MSSPs") and therefore, Azure Sentinel will be discussed as a non-limiting example. However, it shall be appreciated that the other SIEMs are contemplated by the present disclosure. Like most SIEMs, deploying Azure Sentinel requires a high level of skill, and, at the same time, it could be very time consuming, and error prone. Each organization that needs a security solution has special needs around monitoring, and alerting, the log sources to ingest, the detection/alert rules, the response automation, reporting, etc. Although Microsoft (MSFT) is often used by MSSPs to manage multiple clients, the complexity of the initial configuration, deployment, and ongoing maintenance of artifacts (e.g., resource groups, log analytics workspaces, alert rules, workbooks, playbooks, etc.), has been increasing significantly. This can result in a high cost for both the MSSP—who must hire more expensive specialists—and for the client, who often bears at least a portion of the increasing expenses. However, there is often an overlap between some of the deployment needs of varying clients. For example, many organizations may require similar firewall monitoring solutions. In such instances, asset reuse, and re-deployment (and update) may lead to major cost reduction, and simplicity of operations. Unfortunately, known SIEM tools are technologically incapable of taking advantage of such synergies. Thus, from the initial provisioning, collection, analyzing, and classifying data, detecting threats and throughout the automation of incident responses, MSSPs are left with limited re-use opportunities to capture efficiencies across multiple clients. Accordingly, there is a need for improved devices, systems, and methods to implement, and issuing SIEM client updates. Such enhancements could improve the technological performance, and cost effectiveness of SIEM, including the deployment of detection rules, visualizations, investigation workbooks, and ongoing maintenance.

The process of creating, testing, developing, securing, processing, and running security content designed to hunt malicious code is unique amongst any other form of code development. The specific requirements of threat hunters are similar but distinct amongst developers. Therefore, although known SIEM tools and software offer impressive functionality, including the ability to monitor events, collect data, and issue security alerts across a network, current SIEM tools do not provide functionality to conduct threat hunting in real-time while providing MSSPs all the service functionalities necessary to safeguard tenant networks including a proactive ability to respond to threats and changes in client databases in a timely and efficient manner. The larger the number of tenants an MSSP must secure, the more difficult the job of an MSSP becomes and less useful current SIEM tools are. Furthermore, an MSSP must undertake threat-hunting services, and provide security to a number of tenants, each of which may use different SIEM tools. For example an MSSP may access one client database and run the SIEM tools that are relevant to that client, for example Azure Sentinel and Splunk Cloud, these then receive results of security queries. The MSSP may then have to run the same query separately for another client, for example this time only using one SIEM tool such as Azure Sentinel, then receive the results and run the query for another tenant network. This process while is manageable for a small number of clients, the sheer number of queries, the different SIEM or tools applicable to each client, and the differences in databases are not scalable nor efficient across a large number of clients.

Furthermore, there are no uniform set of functionalities provided by current SIEM tools, designed primarily for and targeted towards threat detection and response, current tools also lack automated or continuous monitoring and response abilities, and integration of services and micro-services into a unified threat-hunting environment that would provide an MSSP these capabilities. Current SIEMs also lack other capabilities including logging analytics, issue mass queries to a large number of tenant networks and databases concurrently, and/or querying endpoints of various SIEMs simultaneously, adding tickets, tracking workflows, and actively interface between different micro-services directly via tool integration into a unified threat-hunting environment.

Another problem is the requirement that a threat hunting environment be able to handle egregious amounts of data, while traditional development environments run on local machines and are based on text running on a local system, a threat hunting environment runs queries, responses and other forms of programs and code on downstream tenant networks and databases, therefore handling millions of lines of code generated from queries in real-time, processing that code efficiently to produce a solution is imperative to allow a threat-hunter or security analyst to undertake their duties.

Additionally, Security Content Developers & Threat Hunters have specific needs that are largely unmet in current solutions. While IDE options are numerous among software solutions today, none of them provide the specific tooling, extensions, or connections required to hunt malicious behavior. The result is a multi-tooled approach that often falls short of the threat-hunters need, while also requiring significant cost, time, and administrative overhead to operate. Hunters are forced to keep up with multiple query languages, authentication protocols, tool instructions, functions, methods, variables, reports, visualization techniques, APIs, quotas, document sets, graph sets, indicators of compromise, and more. These administrative tasks are relatively necessary across any single product, but execution tends to differ from one product to the next. The multi-product security landscape forces organizations and individuals to use several products to achieve peak security, meaning in addition to the above items, hunters must also learn product specific language, nicknames, threat vectors, updates, and capabilities. All of this is in addition to the hunters' primary job of finding threats, which has a list of its own requiring significant care.

Accordingly, there is a need for devices, systems, and methods that employ an automated, "as-a-service" approach to generate and deploy reusable pre-packaged solutions that can be executed in a single step, while delivering full, end-to-end SIEM solutions. Such devices, systems, and methods can deploy a Sentinel or other SIEM implementation via a dedicated environment. Accordingly, such devices, systems, and methods can be used to repeatedly scale cloud-based SIEM implementations with consistency.

Finally, the work of MSSPs including threat-hunting requires a connected environment that is able to form simultaneous network pipelines to various servers, services, SIEMs, and/or directly or indirectly connect to tenant networks including client databases and servers. Therefore, the current disclosure presents a threat hunting environment that allows MSSP security analysts and engineers to develop code, and responses in a networked, integrated development environment that produces immediate outcomes through live connections. Many of these responses and queries may be automated, continuous and autonomous, while others may allow human intervention in real-time. A unique set of tools in this environment are provided herein, to allow the development and procurement of programs, codes, and snippets by technicians, analysts and engineers as they respond to threats in real time. The unified, assisted, and networked threat hunting environment as presented herein provides a unified solution that allows MSSPs and other security service providers to leverage connected services while efficiently responding to detected threats in real time and deploying autonomous and automated responses and queries if necessary. The solutions disclosed herein are referred to as the "threat-hunting environment" or "the platform".

The current solutions provide systems and methods for a networked and computer assisted integrated threat-hunting environment and toolkit created for developing and testing security content and threat hunting amongst numerable databases, tenant networks, or other information sources as accessible via internal or external networks. The solutions presented herein provide the functionalities necessary for authentication, querying and detecting threats in tenant networks, prioritizing and filtering results and responding to threats automatically or via security engineers and analyst manually writing codes and pushing instructions onto SIEMs and tenant networks. The integrated environment provides tools allowing users to prioritizing threats and tools allowing users to develop content and code for SIEMs through the integrated connected threat-hunting environment by creating analytic rules that may be run across a large number of customers. These rules may run and retrieve results, generate alerts for the security analyst, run sample queries, analyze results all through the integrated threat-hunting environments. The solutions also allow users to keep notes, save historical data as well as code snippets and programs for later use.

The present disclosure also provides a connected threat-hunting environment, where tenant networks are connected to the environment and may be queried and interacted with directly or indirectly through SIEMs or other services. The present disclosure also allows a full coding toolbox to run in the environment and instructions as written be deployed immediately and pushed out to one or more tenant networks, through SIEMs or other services. The technologies presented herein therefore can run written instructions and code on downstream databases with the threat-hunting environment running on a local machine or SOAR management server allowing engineers to deploy solutions and updates on a wide scale to downstream tenant networks.

The present disclosure also provides the ability to write programs and code in various languages, including traditional object oriented languages like java, functional languages like python, and definitional languages, as well as several other languages including JavaScript, ruby, Typescript, NodeJS, ElectronJS, RUST, WASM, C #, Dart and Flutter, but also supports writing code in SQL, and query languages that are designed specifically for one or more SIEM programs such as Splunk's query language, and Cousto for Microsoft Sentinel. The threat-hunting environment also allows syntax highlighting and suggestions and auto-complete functions when writing in these languages. The present disclosure also provides functions that ensure efficient processes of large amounts of data being retrieved from multiple tenant networks, and provides for techniques to organize and paginate queries and results returned from queries to ensure that the environment is able to manage the vast data loads while simultaneously able to address and respond to them.

While the present technology is susceptible of embodiment in many different forms, there is shown in the drawings and will herein be described in detail several specific embodiments with the understanding that the present disclosure is to be considered as an exemplification of the principles of the present technology and is not intended to limit the technology to the embodiments illustrated.

Referring now to FIG. 1, a block diagram of a system 1000 configured to remotely manage another organization's Security Orchestration, Automation, and Response ("SOAR") is depicted in accordance with at least one non-limiting aspect of the present disclosure. According to the non-limiting aspect of FIG. 1, the system 1000 can include a SOAR management server 1002 comprising a memory 1006 configured to store a SOAR application (see FIG. 2), and a processor 1004 configured to execute the stored SOAR application (see FIG. 2), as will be discussed in further reference to FIG. 2. For example, the SOAR management server 1002 can be a computational resource either owned or leased by the managed security service provider ("MSSP"). The SOAR management server 1002 can be communicably coupled, via network 1008, to a plurality of tenants 1010*a*, 1010*b* 1010*n*. Each tenant 10101, 10102 . . . 1010*n* of the plurality can represent a customer (e.g., organization) contracting with the MSSP. According to the non-limiting aspect of FIG. 1, the network 1008 can include any variety of wired, long-range wireless, and/or short-range wireless networks. For example, the network 1008 can include an internal network, a Local Area Networks (LAN), WiFi®, cellular networks, near-field communication (hereinafter "NFC"), amongst others.

In further reference to FIG. 1, each tenant 10101, 10102 . . . 1010*n* of the plurality can host one or more instances of one or more clients 1012, 1014, 1016. For example, a first tenant 10101 can include one or more machines implementing one or more client applications 10121, 10122 . . . 1012*n*, a second tenant 10102 can include one or more machines implementing one or more client applications 10141, 10142 . . . 1014*n*, and/or a third tenant 1010*n* can include one or more machines implementing one or more client applications 10161, 10162 . . . 1016*n*. Each tenant 10101, 10102, and 1010*n* can include an intranet by which each machine implementing the client applications. For example, each tenant 10101, 10102, and 1010*n* can each represent a customer, such as an organization, contracting with the MSSP for security services.

Accordingly, the SOAR management server 1002 can be configured to have oversight of each tenant 10101, 10102, and 1010*n* of the plurality, and thus, is responsible for monitoring, and managing each client application 1012, 1014, 1016 for threats. As previously discussed, the differences, and complexity in tenant 10101, 10102, and 1010*n* architecture can complicate this, and render it inefficient for the MSSP. Thus, known SOAR tools can leave the tenants 10101, 10102, and 1010*n* technologically exposed, and thus, vulnerable to attacks. According to non-limiting aspects of the present disclosure, the SOAR management server 1002 can implement a SOAR management application (see FIG. 2) that technologically, and practically addresses these deficiencies by enhancing the ability of the SOAR management server 1002 to manage, and transmit alerts, and client application updates for multiple tenants based on correlated, and synergistic development needs. Moreover, the architecture 2000 of FIG. 2 further illustrates different means of communication between the various modules and Referring now to FIG. 2, a block diagram of a functional architecture 2000 of the system 1000 of FIG. 1 is depicted in accordance with at least one non-limiting aspect of the present disclosure. According to the non-limiting aspect of FIG. 2, the architecture 2000 can include a content library 2002, a variable store 2004, an automation schema 2008, and a service operation engine 2012 collectively provided via an application stored in the memory 1006 (FIG. 1) of the SOAR management server 1002. According to some non-limiting aspects, the SOAR management server 1002 can be remotely located relative to the MSSP and/or tenant 1010*n*. For example, the SOAR management server 1002 may be cloud-based. When executed by the processor 1004 (FIG. 1), the application's content library 2002, variable store 2004, automation schema 2008, and service operation engine 2012 can collectively facilitate the simultaneous configuration, management, and/or control of multiple SOAR platforms 2018 for multiple tenants 1010*n*, or client organizations, at scale. Moreover, when executed by the processor 1004 (FIG. 1), the application can support a client organization's SOAR platform 2018 in either an abstract or a dynamic way, as will be described in further detail herein.

According to some non-limiting aspects, the application deployed by the SOAR management server 1002 can be configured as an Azure Sentinel Automation Portal (ASAP), as disclosed in U.S. Provisional Patent Application No. 63/196,458 titled DEVICES, SYSTEMS, AND METHODS FOR ENHANCING SECURITY INFORMATION & EVENT MANAGEMENT UPDATES FOR MULTIPLE TENANTS BASED ON CORRELATED, AND SYNERGISTIC DEPLOYMENT NEEDS and filed Jun. 3, 2021, the disclosure of which is hereby incorporated by reference in its entirety. For example, according to one non-limiting aspect, an ASAP portal runtime software code can include server middleware that is responsible for processing the content from the content library 2002, the connections to the SOAR platform 2018, and/or other services, and services requests for the SOAR management server 1002 to deploy, update, and/or read. In other words, the application deployed by the SOAR management server 1002, including the content library 2002, the variable store 2004, and the automation schema 2008, can provide a unified, simplified view of all tenant 10101-*n* (FIG. 1) deployments, in conjunction with an ability to work with one or multiple tenants 10101-*n* at the same time.

The content library 2002 can be configured to store various artifacts (e.g., detections, automations, workbooks, alert rules, playbooks, etc.) by which the SOAR management server 1002 can configure and manage a SOAR platform for one or more tenants 1010*n*. According to some non-limiting aspects, the content library 2002 of FIG. 2 can be stored locally relative to the application, meaning it is provided via the memory 1006 (FIG. 1) of the SOAR management server 1002. However, according to other non-limiting aspects, the content library 2002 can be stored on a remote server communicably coupled to the SOAR management server 1002. In still other non-limiting aspects, the content library 2002 can be provided by a third-party provider (e.g., GitHub, GitLab, etc.), similar to those disclosed in U.S. Provisional Patent Application No. 63/196,458 titled DEVICES, SYSTEMS, AND METHODS FOR ENHANCING SECURITY INFORMATION & EVENT MANAGEMENT UPDATES FOR MULTIPLE TENANTS BASED ON CORRELATED, AND SYNERGISTIC DEPLOYMENT NEEDS and filed Jun. 3, 2021, the disclosure of which is hereby incorporated by reference in its entirety. In summary, the content library 2002—and more specifically, artifacts stored within the content library 2002—controls rules by which the SOAR management server 1002 can remotely interface with and/or manage a SOAR platform 2018 for the tenant 1010*n*, or client organization. For example, the content library 2002 can store one or more rules and/or a template configured to automate the deactivation of a user account if the SOAR management server 1002 and/or SOAR platform 2018 determines that, based on detected variables throughout the tenant architecture 1010*n*, a determined risk score exceeds a predetermined threshold.

According to the non-limiting aspect of FIG. 2, tenant 1010*n* requirements, such as variability points, that are specific to a particular client organization and/or tenant 1010*n* architecture can be provided to artifacts stored in the content library 2002. The content library 2002 can achieve this in accordance with a deployable artifact template, as disclosed in U.S. Provisional Patent Application No. 63/196,458 titled DEVICES, SYSTEMS, AND METHODS FOR ENHANCING SECURITY INFORMATION & EVENT MANAGEMENT UPDATES FOR MULTIPLE TENANTS BASED ON CORRELATED, AND SYNERGISTIC DEPLOYMENT NEEDS and filed Jun. 3, 2021, the disclosure of which is hereby incorporated by reference in its entirety. For example, the content library 2002 can contain "JSON" files for defining alert rules, workbooks, playbooks, etc. As new content is added to the content library 2002 or existing content is updated, the changes can be automatically pushed via the SOAR management server 1002 to the SOAR platform 2018 of the tenant 1010*n*. In other words, the SOAR management server 1002, when deployed, can be configured for each tenant's 10101-*n* (FIG. 1) specific SOAR needs, which will vary based on each tenant's architecture.

The variable store 2004 can be configured to further customize the interface between the SOAR management server 1002 and the tenant 1010*n*, or a client organization's, architecture. For example, the variable store 2004 can enable a user of the SOAR management server 1002, such as an MSSP, to define and/or link variables associated with the tenant 1010*n* architecture, as detected by the SOAR management server 1002, to various artifacts stored in the content library 2002, which enhances the ability of the SOAR management server 1002 to automate a client-specific implementation. According to some non-limiting aspects, variables can be stored using a primary key that indicates the destination environment uniquely. For example, when onboarding an environment to be managed, an MSSP, or another user, can indicate admin accounts tied to the environment so that they could be configured when content is being deployed to that particular environment. Accordingly, an automation being deployed may need to be fed which accounts are administrators so that it runs automations specific to those account roles.

The automation schema 2008 can be configured to recognize commonalities between various tenant 10101-*n* (FIG. 1) architectures and standardize the implementation of the SOAR management server 1002. This represents a significant technological improvement beyond a conventional SOAR management platform, which is configured to either be implemented for a single client organization or would require a significant amount of manual labor to implement across multiple tenants 10101-*n*, or client organizations. For example, conventional SOAR platforms require the assessment of client-specific environments and needs, which requires the design and implementation of a custom solution. The automation schema 2008 of FIG. 2, in conjunction with the content library 2002 and the variable store 2004, enable the SOAR management server 1002 of FIGS. 1 and 2 to automatically generate customized SOAR solutions and scale such solutions across an unprecedented number of tenants 10101-*n*, or client organizations, simultaneously.

In further reference to FIG. 2, an example of one such tenant 1010*n* architecture is depicted in accordance with at least one non-limiting aspect of the present disclosure. The SOAR management server 1002 can be configured to detect variables associated with the tenant 1010*n* architecture, as well as design and deploy a tenant 1010*n* specific configuration including one or more of the modules illustrated in FIG. 2. For example, according to the non-limiting aspect of FIG. 2, the tenant 1010*n* architecture can include a remote SOAR platform 2018, a dashboard/reporting module 2022, and one or more security tool application program interfaces ("API's") 2020*a-d*. Each security tool API 2020*a-d* can be configured to prevent malicious attacks on, or misuse of, a client's API's deployed on the tenant 1010*n*. Because APIs have become key to programming web-based interactions, they have become a target for hackers. Thus, the security tool API's 2020*a-d* can monitor the client's API's and transmit an alert 2030 back to the SOAR platform 2018 if a suspicious event is detected.

According to some non-limiting aspects, the dashboard/reporting module 2022 can include a customizable, visual representation of the tenant's 1010*n* cyber security. For example, dashboard/reporting module 2022 can enable the MSSP and/or employees of the client organization to see what is happening across the tenant 1010*n* network and take remedial actions to secure the network in response to identified threats. This can help the MSSP and/or client organization, identify, prevent, mitigate, and/or predict cybersecurity incidents in a significantly more efficient way. Of course, the specific tenant 1010*n* architecture of FIG. 2 is merely presented for illustrative purposes. According to other non-limiting aspects, the tenant 1010*n* architecture designed and deployed by the SOAR management server 1002 can be alternately configured to include alternate types and/or quantities of modules. The ability of the SOAR management server 1002—and more specifically, the content library 2002, the variable store 2004, and the automation schema 2008—enables customized SOAR-based solutions that can be remotely managed on behalf of the tenant 1010*n*. Each solution is different, depending on the variables detected by the variable store 2004 and artifacts selected from the content library 2002 based on the detected variables, as deployed by the SOAR management server 1002.

Moreover, the architecture 2000 of FIG. 2 further illustrates different means of communication between the various modules of the SOAR management server 1002 and the one or more tenants 1010*n*. For example, certain modules, such as the API broker 2006 may communicate with other modules, such as the service operation engine 2012, the graphical user interface 2010, the remote SOAR platform 2018, and the dashboard/reporting module 2022 via a service layer 2024. Other modules, such as the content library 2002, the variable store 2004, and the API broker 2006, may communicate with the remote SOAR platform 2018 of the tenant 1010*n* via a management and content delivery layer 2026. The remote SOAR platform 2018 may communicate with the one or more security tool API's 2020*a-c* of the tenant 1010*n* via a SOAR communication protocol 2028. The one or more security tool APIs may communicate alerts back to the remote SOAR platform 2018 in accordance with rules defined by the applied artifacts 2032 from the content library 2002, as defined by variables from the variable store 2004, via an alert protocol 2030. The influence that the selected artifacts from the content library 2002 and the detected variables from the variable store 2004 have on the artifacts 2032 are illustrated in FIG. 2 via corresponding cross-hatching. In other words, although similar or the same protocols and/or methods can be applied, each means of communication can include different content. Thus, an end user can leverage the architecture 2000 of FIG. 2 either with or without a specific Managed Detection and Response ("MDR") service on top. However, when delivered with a specific MDR service, the same APIs can be used with the specific MDR service users interfacing with the APIs, managing the architecture 2000, and taking actions on behalf of one or more tenants.

As is illustrated in the non-limiting aspect of FIG. 2, the various modules of the architecture of the SOAR management server 1002 may be configured to communicate with, manage, and control the remote SOAR platform 2018 of the tenant 1010*n* in accordance with specific artifacts 2032 from the content library 2002, which are autonomously selected variables associated with the tenant 1010*n*, as determined by and/or previously stored in the variable store 2004. Accordingly, the content library 2002 and variable store 2004, in conjunction with the automation schema 2008, can enable the SOAR management server 1002 to autonomously generate a custom configuration to integrate with and remotely manage each tenant's 1010*n* SOAR platform 2018. For example, an artifact 2032 can define the means by which the API broker 2006 and service operation engine 2012 of the SOAR management server 1002 interface with the remote SOAR platform 2018 of the tenant 1010*n*. Additionally, artifacts 2032 can further define the content alerts 2030 and the conditions under which they are sent from the one or more security tool API's 2020*a-d* to the remote SOAR platform 2018.

The SOAR management server 1002, including the content library 2002, variable store 2004, and automation schema 2008, can provide a powerful cloud-based tool by which MSSP's can remotely manage a client organizations SOAR platform 2018. Although the primary interface is the graphical user interface 2010, the API interface 2006 can further allow programmatic control of SOAR platform 2018 management capabilities, which enables a user to deploy content in the form of playbooks, automations, integrations, dashboards, and other SOAR controlling code-based content to remote environments, such as the tenant 1010*n*, through a central interface. Additionally, the content library 2002, variable store 2004, and automation schema 2008 of the SOAR management server 1002 provide features that allow the customization of that content and allow for bespoke deployments based on tenant 1010*n* specific needs. In other words, the SOAR management server 1002 can provide a modular and extensible way of referencing a stored library of code and content (e.g., the content library 2002) such that options may be autonomously decided at the time of deployment.

For example a user could deploy a series of artifacts stored in the content library 2002, such as playbooks, code, integrations, and/or dashboards, that can enable the integration of a next-generation antivirus ("NGAV") product, an email security product, and/or an identity protection product and subsequently automate the stages of detection, investigation, and response based on controls they received from the user via the graphical user interface 2010. Additionally and/or alternatively, the SOAR management server 1002 can enable a user to automate a portion of the tenant's 1010*n* architecture or environment. Moreover, the graphical user interface 2010 can enable a user to "opt in" and/or "opt out" of automated features, as presented by the automation schema 2008, via an easy to follow wizard-like, walk through, application. The user can further customize reporting and/or dashboarding features and preferences to be applied via the dashboard/reporting module 2022, which can be packaged for deployment alongside the automated content.

According to some non-limiting aspects, the application launched by the SOAR management server 1002 can be extensible, meaning it can be configured with the ability to extend or stretch in terms of the number of tenants 1010*n* whose SOAR platforms 2018 it can remotely manage (e.g., scalability) and/or the number of SOAR management capabilities it provides. In other words, the application, including the content library 2002, the variable store 2004 and the automation schema 2008, can be designed to minimize the level of effort required to enable the SOAR management server 1002 to be extended for future use. For example, through an extensibility mechanism provided by the application launched by the SOAR management server 1002, pluggable add-ons configured to enable additional service components and features of the SOAR management server 1002 can be deployed in the future.

According to some non-limiting aspects, the extensibility mechanism can be implemented in various ways to allow plugging in additional SOAR service components. For example, authentication mechanisms, such as DUO, Okta, amongst others, can be supported concurrently. These authentication mechanisms may not be hard coded, but configuration files can be discoverable (e.g., the main "config" file for each of the authentication mechanisms can be placed in a well-known repository location that is being scanned for new or deleted files). If a new configuration, such as Azure AD, is going to also be supported, the corresponding configuration file for Azure AD will be placed in the same repository location as Duo and Okta configs, and will be discovered by the application management server and presented to users to select from and configure at a client, as needed. The configuration file can comply with a schema defined and understood by this application management tool, and the user interface can be generated and populated accordingly. Notably, the SOAR applications discussed herein are built in a way to easily be extended with additional configuration capabilities that are not hard coded in its source code, but plugged in dynamically, through new configurations in accordance with this method.

When the user deploys these add-ons via automation, it can trigger the application launched by the SOAR management server 1002 to enable additional subscription-based services on behalf of the MSSP, which can enhance the tenant's 1010*n* security and health monitoring. Additionally and/or alternatively, the application deployed by the SOAR management server 1002 can be configured to work with existing "unmanaged" content, which may enable at least some discovery and light management of the previous SOAR assets that are already deployed by the tenant 1010*n*, in lieu of generating a completely new and customized tenant 1010*n* architecture, as is depicted in FIG. 2.

As previously discussed, when executed by the processor 1004 (FIG. 1), the application can be configured to abstractly and/or dynamically manage a client organization's SOAR platform 2018. For example, in an abstract implementation, the SOAR management server 1002 can employ generically-defined artifacts (e.g., automations) that are stored in the content library 2002, as disclosed in U.S. Provisional Patent Application No. 63/196,458 titled DEVICES, SYSTEMS, AND METHODS FOR ENHANCING SECURITY INFORMATION & EVENT MANAGEMENT UPDATES FOR MULTIPLE TENANTS BASED ON CORRELATED, AND SYNERGISTIC DEPLOYMENT NEEDS and filed Jun. 3, 2021, the disclosure of which is hereby incorporated by reference in its entirety. Generically-defined artifacts, for example, can include a block of executable code. However, platform-specific implementations can be subsequently provided (e.g., Azure Defender, Crowdstrike, etc.). Abstract automations/playbooks can be written in a generic format and subsequently translated to a specific format upon deployment. For example, an automation/playbook can be created that is particularly configured to deactivate a user's email account in the event of a business email compromise. However, upon actual implementation of that automation/playbook in a particular customer environment, the system 1000 (FIG. 1) and functional architecture 2000 (FIG. 2) disclosed herein can translate generically written content into a version which is specifically implemented for the specific mail application a tenant is using. In this way, content can be generated that can be adapted programmatically to multiple environments without having to rewrite it, unlike convention systems and architectures. Accordingly, the system 1000 (FIG. 1) and functional architecture 2000 (FIG. 2) disclosed herein provides a significant technological solution—flexible formats and interface—to a technological problem—incompatibility of conventional automations/playbooks, which enables users to scale services to a number of tenant's and their authentication mechanisms.

Alternately, in a dynamic implementation, the SOAR management server 1002 can dynamically generate new automation types via the content library 2002, which can be automatically detected by, and displayed for selection via, the graphical user interface 2010 for subsequent deployment. Similarly, new automations, such as endpoint monitoring solutions (e.g., CarbonBlack, etc.), can be added to the content library 2002 for a given automation type, such as those that block the execution of harmful programs detected by the automations (e.g., block executable file automations, etc.). Similar to, and it becomes automatically available to the GUI, and can be deployed to the appropriate client SOARs (that use those security tools).

Upon deployment via the SOAR management server 1002, tenant 1010*n*, or client, specific variability points can be detected by the variable store 2004 and correlated to artifacts stored in the content library 2002. For example, the SOAR management server 1002 has the ability to configure automatic response/remediation actions (e.g., playbooks) for a given configuration. These remediation actions can require an optional step, for example, the tenant may have to first approve the action. So, while the configuration of a remediation automation may involve similar configuration for the actual tasks (e.g., block an account), the approval step may be done manually through a phone call, or an email, or a workflow form (e.g., integration via service tickets). As such, the approval step can be variable (e.g., may or may not exist, and when it exists it may be accomplished in a number of ways), requiring pulling the appropriate code and configuration from the automation repository to configure for this client and SOAR automation.

Thus, at deployment, the variability points can be configured for tenant 1010*n* specific SOAR needs, based on the network architecture of the tenant 1010*n*. According to one non-limiting aspect, the SOAR management server 1002 may automate the SOAR platform 2018 to block a user account upon detection of a security event based on inputs received by the security tool API's 2020*a-d*. For example, the automation may include a number of steps or conditions, such as approval from a tenant 1010*n* administrative account. During the deployment—for example via a wizard presented via the graphical user interface 2010—the automation may request the user to provide information (e.g., a phone number, a short message service ("SMS") address, an email address, etc.) associated with one or more administrative accounts for the tenant 1010*n*. Thus, particular steps and/or conditions, such as contacting and/or prompting action from the administrative account, can be programmed into the automation via the graphical user interface 2010.

According to one non-limiting aspect, upon running the custom automation, the SOAR management server 1002—and more specifically, the custom automation generated by the SOAR management server 1002—can manage the SOAR platform 2018 to detect a security event based on inputs/alerts received from one or more security tool API's 2020*a-d*, and determine that a user account should be blocked. The SOAR management server 1002 can manage the SOAR platform 2018 to notify the administrative account and the automation will wait for approval, and, upon receiving the approval, can continue on to subsequent steps of the automation, ultimately resulting in the removal of the suspect account from the tenant 1010*n* network. As described earlier, this can be abstracted into the automation type, with specific implementations for each security tool API 2020*a-d* and/or notification method. Removing a suspect account is just one example of actions the SOAR platform 2018 can take to enhance the security of a tenant 1010*n* network. For example, aside from blocking an account, the SOAR platform 2018 can also delete a suspect file, email to the security administrator, amongst other actions.

Once deployed by the SOAR management server 1002, the artifacts 2032 (e.g., automations) can reside in the tenant's 1010*n* architecture and, depending on the non-limiting aspect, the MSSP and/or the client can modify the deployed configuration. For example, according to some non-limiting aspects, the client may desire to control the deployed configuration across the tenant 1010*n* network. However, according to other non-limiting aspects, the client may desire for the MSSP to have exclusive control of the configuration. Regardless, the application deployed by the SOAR management server 1002 can be configured to automatically detect changes made by the MSSP and/or the client and use them for future deployments and/or the management of updates to the already deployed artifacts 2032. According to some non-limiting aspects, such changes can be utilized by an artificial intelligence stored on the memory 1006 (FIG. 1) of the SOAR management server 1002 to adapt one or more artifacts 2032 (e.g., templates, workflows, etc.) in the content library 2002 for enhanced deployments for similar clients and/or architectures. Accordingly, the content library 2020 can serve as a contribution mechanism that, when deployed by the application on the SOAR management server 1002, along with the graphical user interface 2010 and API broker 2006, can abstractly and/or dynamically detect updates to both the content library 2002 and the client's SOAR platform 2018. These updates can be collectively managed through the SOAR management server 1002, which serves as a central console for the system 1000 (FIG. 1), and can enable unprecedented scalability to manage a great number of clients. As such, the SOAR management server 1002 can remotely manage another client's SOAR platform 2018 with reliability and consistency. Due to its modular design, it can also be "future proofed," allowing users and third party applications to contribute new artifacts 2032 and/or update existing artifacts 2032 them, as third party vendor solutions evolve.

FIG. 3 presents a diagram of a method for security enhancement of a tenant network via an integrated threat-hunting environment. In this method 100 to undertake threat-hunting activity via the threat-hunting environment disclosed, a threat-hunting environment is first executed 105 on a local server or local computing device, the executed environment is then used to query 110 the one or more tenant networks with instructions developed by an optimized threat-hunting code editor. The core of the threat-hunting development platform is a code editor optimized specifically for threat hunting, connected to downstream information sources through the (optional) aid of an API gateway using API Runtime Decoration, Data Discovery for Search Optimization (also referred to herein as "DDSO"), and Dynamic Exception Processing (also referred to herein as "DEP"). Queries are written by the threat hunter, assisted by the code editor, to search and process information sources. Information sources are not limited to any provider, and thus are expandable to any service that provides interfacing capability. Examples of information providers are databases, SIEM systems, Endpoint Detection and Response platforms, threat feeds, indicator lists, cloud platforms, static files, and user defined libraries. Where consumable information exists, the platform seeks to normalize, index, and extend capability to meet the needs of the hunter or developer. The hunter has the option of defining a specific scope of targets, or allowing DDSO to dynamically choose targets based upon the query entered.

Once the query is executed, and because querying and processing multiple databases across networks of SIEMs creates unique needs, requests are pre-processed, aggregated, and fired across multi-networked channels including web APIs, local databases, and processed files. Errors are intelligently gathered and displayed as results received 115 to become useful information to the hunter, who will shape their search upon layers of results. Multiple security products are searched in tandem and deduplicated where applicable and preferred. Authentication is requested and delegated only where needed, preferring stateless architecture and edge processing wherever possible.

Results are designed to be moldable and exportable to the hunters' needs. Post processing techniques are developed to enhance and simplify wherever possible. Next steps, like SOAR automations or ticket creation, are built into the environment, including context of search and threat data on submission. The storage and processing of millions of table results on a per-user basis requires special care to maintain a user-friendly experience. The aggregation of authentication solutions requires additional care to prioritize stateless design and security.

The results received generate significant amounts of loggable data, which may be done natively on the platform, logging of received or generated result data may also happen on individual APIs. Results may then be analyzed statistically 120. Automated analysis can include analyzing levels of threats, indicators of threat, producing threat score levels and scores and prioritize threats that the analysis is able to detect and identify. One example of such analysis is disclosed in U.S. Provisional Patent Application No. 63/369,582 titled AUTONOMOUS THREAT SCORING AND SECURITY ENHANCEMENT, filed on Jul. 27, 2023, the disclosure of which is hereby incorporated by reference in its entirety. Because threat hunting is less of a linear pipeline and more of a cycle, there is no necessary start-to-finish user behavior expectation, and rather tools are designed to be usable and moldable to any point in the threat hunting process. Therefore, subsequent instructions may be pushed 125 to the tenant networks responding to the detected threats.

FIG. 4 presents a diagram of the relationship between the MSSP control computer system which may be a SOAR management server 450, corresponding to SOAR management server 1002 as disclosed in FIG. 1. All the steps provided herein, as well as the systems described are optional and may be undertaken in any order. The order of steps is not limited to the presented embodiment in FIG. 4 and the steps may occur in any order or combination desired. The threat-hunting system 400 presents the relationship between different parts of the system 400 and the interactions between the SOAR management server 450, the SIEMs/services 460, and the tenant networks 470. In the displayed aspect of the environment 400, a threat-hunting integrated environment is executed 401 on the SOAR management server 450, which in various aspects be or include a local computing device(s). When a user executes the threat-hunting environment, their credentials and access levels must be authenticated in relation to either both or one of SIEMs/services 460 and/or the tenant network(s) 470. One or more of the SIEMs/services 460 and/or the tenant network(s) 470 receive the authentication request 403 and 405. In various embodiments the authentication request is sent 404 via the SIEMs/services 460 to tenant network(s) 470.

The SIEMs/services 460 and/or the tenant network 470 may authenticate 406, 407, the user, computing device running the threat-hunting environment, or the SOAR management server 450 which may receive the authentication and form a connection or send a connection request to one or more tenant networks through SIEMs/services 460, which in turn may form one or more pipelines or connections to one or multiple tenant networks 470. In various embodiments, these connections are kept open by ensuring that the HTTP requests are kept alive throughout a session and not just for one request, call or query. This ensures that the connection to an endpoint in tenant network(s) 470 allows continuous communications between the SOAR management server 450 and/or the SIEMs/services 460 and itself 470. This is because a standard request or HTTP call generally initiates a connection, carries out the query or request, then terminates the connection, therefore a lot of overhead is used when several connections have to be repeatedly made and terminated to allow the flow of data and communications between the tenant network(s) 470 and the SOAR management server 450 and/or SIEM 460. This solution overcomes unnecessary overhead from forming a large number of PCP handshakes. Of course the connections made herein may include multiple connections from the SOAR management server 450 and the threat-hunting environment it is executing, in addition to multiple connections to various SIEMs/services 460 and/or direct connections to tenant networks 470 when necessary. A typical workflow may include a SOAR management server 450 connecting with Gitlab, Azure Sentinel, Windows Defender, and Jira. In turn, the client facing SIEMs such as Sentinel and Windows Defender may also be maintaining connections to multiple tenant networks 470, all these connections controllable by the disclosed threat-hunting environment running on the SOAR management server 450.

The threat-hunting environment includes a code editor capable of writing queries in any of the languages of the SIEM software 460, and changes languages automatically in the user-interface based on what SIEM the user is interacting with on the threat-hunting environment in the SOAR management Server 450. The code editor may also include syntax highlighting, auto-complete of functions, and allows users to load languages and settings in a customized manner, for example a package of languages for certain tenant networks 470 may be saved for later use, and a number of languages applicable for each SIEM/service 460 may be selected or automatically applied as the user navigates through different SIEMs/services 460 and tenant networks 470 via the user interface.

This threat-hunting optimized code editor allows the user, threat hunter, or security analyst to write a query 412 which is then sent 413 to one or more tenant networks via one or more SIEMs/services 460. The user may select or define which SIEMS/services 460 or tenant networks 470 to target or include when running a query. After the query is sent, a dashboard may also allow the user to write or send 414 new data, instructions or code in real-time and/or during runtime which may either further refine the instructions, adjust the query and/or its parameters based on preliminary results or to respond to threats detected or results being obtained. This in many embodiments may be autonomously be carried out without human involvement by the threat-hunting environment.

In various embodiments, the threat-hunting environment or platform running on SOAR management server 450 allows for live session sharing and recording, and code editing between members of a security team of operators. This provides the ability for security analysts and users of the threat-hunting environment to edit code with each other and respond to threats by writing queries across different devices, SIEMs 460, and tenant networks 470. The code editor also includes linting, debugging, saving, and updating code features. Linting is of special importance, and is run to optimize and correct code and reduce memory usage when necessary. Various SIEMs have limits to the number of lines of code that may be deployed, and automated linting, code management, and optimization is of significant importance to the platform. The platform also relies upon a performance optimized code-base utilizing low-level programming to enable massive search query caching and indexing. Optimized code may include techniques such as metadata capture, where if a list of tables is required, which may be a list of tens of thousands of items in a single JSON file for each client or tenant network, each with multiple environments, then metadata is used to filter out the data that is captured and retrieved, so for example, instead of retrieving full files, the platform only retrieves for example, the names of tables, or a name in a specified column of a table, that may be extracted from data objects that may include JSON files or dictionaries.

Both the initial queries as well as subsequent queries and instructions may all be pushed 416 to tenant networks 470. In several embodiments the SOAR management server 450 may autonomously add new data, filters, instructions and the like to respond to results obtained, or during runtime of the query and as each result as it is being processed and/or the query run. The queries may run on the tenant networks 470, and results are generated 418 and sent 419 to the SOAR management server 450 or the SIEM/services 460. In preferred embodiments the SIEM/services 460 receives the results which are then displayed on the threat-hunting environment UI running on the SOAR management server 450. These results may be displayed 421 on one or more display panes on a user-interface of the threat-hunting environment. The queries written or the instructions sent in steps 413 and 414 may be subjected to smart search functionality 422 by the threat-hunting environment, wherein the query is able to automatically and autonomously determine which functions, queries and tables apply to each tenant network. The smart search functionality is comprised of the threat-hunting environment recognizing functions and reference tables inside a query, wherein the threat-hunting environment recognizes the tenant networks and SIEMS that the query is applicable to and automatically removing any other SIEMs and tenant networks. Therefore instead of having hundreds or thousands of API calls every time a mass query is sent out by the threat-hunting environment to each client, and then determining whether each tenant network or SIEM is relevant to the query, smart search functionality recognizes this beforehand and only allows establishing connections to endpoints of tenant networks 470 or SIEMs/services 460 to which the query applies, based on the functions in the query, and tables the query relies upon or calls, and may remove 423 any tenant networks 470 or SIEMS/services 460 from the query. This reduces overhead, computing expenses and memory usage on the system and network calls. The smart search functionality may also display the clients that are relevant or for which the query applies to the user on the SOAR Management Server end 450. Smart search functionality may also depend on the specific SIEM/service 460 and/or tenant network 470 involved in a query. For example Azure sentinel uses an API with a list that is repeatedly utilized by tenant networks, the smart search functionality determines intersections between different tenant networks 470 from these lists, to determine which function or table is relevant to each tenant network and which should or should not be connected to.

Instructions, code and queries that are written or automated, may also be saved into a database or the threat-hunting environment for the user or for the whole SOAR management server 450. Code could be saved as snippets, i.e., small pieces of code that do not deserve their own files, but may be available for user in a specific UI or UI pane. Code that returns results may also be flagged as such either by user or automatically by the system if the results it generates are highly successful or efficient, and the query then may be saved in the system.

Based on the tenant network 470 that is being targeted, dynamic exception processing may be applied 425, for the specific tenant network 470, when a query is being executed. Dynamic exception applies when there are unique needs or queries, for example an instruction to "return results except a list of whitelisted IP addresses". This request could be interpreted as relying on a global whitelist across all tenant networks, or alternatively it could apply to a whitelist per customer. The Dynamic exception processing in the threat-hunting environment is able to discern and translate the request at run time by adjusting functions for each client. Another example may be a request to "limit results to 10" this could mean display 10 results at a time, or 10 results per customer, or return 10 results in total globally. The triggering of a DEP may be based on previously saved rules for the specific tenant network 470, that may be stored in a database or file, the dynamic exception file or rule is accessed at runtime, and dynamically can alter the query based on the rules for that specific tenant network 470. Specific client rules may be saved that are triggered or that inform dynamic rule exception execution when generic queries are run. One way these could be applied are via pre-determined or set IP addresses which affect how methods or functions apply to one or more defined IP addresses.

Dynamic exceptions could also be undertaken at a mass tenant-network level, wherein a large number of exceptions are run once a query initiates based on specific rules for each tenant network 470 that alter, adjust or update the query according to the specific needs and requirement of the tenant network 470 being queried. This may be a dynamic exception stored in any database, or component of system 400. Dynamic exceptions may also apply based on client or tenant-network categories, wherein special rules are triggered for tenant networks 470 that fall within specific categories such as the security service contract they have purchased, or services, or agreement they are subscribed to.

In various embodiments, API runtime-decorations may be deployed 438. This occurs during the run-time of a query or when pushing instructions to tenant networks, where in real-time, in some embodiments an API broker may be used to retrieve some results, add metadata to the results, which may include data on what the search or query is, the details on the threats and techniques the query or search covers, and then resume the query if it was paused, or otherwise transmit the data added during runtime to a database in a tenant network. This in various embodiments could also be expanded into adding new functionalities, including adding metadata that adjusts a query based on partial results retrieved, if analysis is conducted on the partial results and it becomes clear that a change or adjustment should be applied to the query to improve the results or to target a specific threat. Run-time decorations may also be used for reporting information to customers or adding any type of instructions or metadata during runtime of a query. Runtime decoration may also include pagination features, where a large JSON file is paginated in a browser or in the threat-hunting environment/platform which parses the results automatically and only delivers or sends data to the SOAR management server 450, the SIEM 460 or the tenant network 470 that is relevant or selected from the pagination process.

The threat hunting SIEMs/services 460 are able to receive any of the discussed queries from the SOAR management server 450 and push 427 the queries to one or more tenant networks 470 that receive them 428, generate results, and based on query results may return partial results 430 or return the full result 431. The SIEMs/services 460 receive results 432 which may be displayed 43 on the UI on the SOAR management server 450 side. Responses to the received results may also be generated 434, these may be user generated or automated by the threat-hunting environment, the responses are received by the SIEM/services 460 and are pushed 436 onto the one or more tenant networks to be run 437 to respond or neutralize detected threats.

FIG. 5 presents one embodiment of the User-Interface (UI) for the integrated threat-hunting environment. UI 500 includes a code editor section 501 where queries may be entered, edited, and executed, a results pane 502 which lists all results returned from a query, and may include information such as the client name, tenant ID, time generated, the display name of threats, or of queries run, and/or a listing of results, threats detected, and/or classification of threats. The UI may also include a logging screen 503 which sets how alerts are generated or results are logged. Finally the UI may include an error or threat alert side pane 504 to display returned errors during or after runtime.

FIG. 6 presents another embodiment of the UI for the integrated threat-hunting environment. UI 600 includes a client view side pane 601 that lists all the clients/tenant networks and each of their workspaces or databases. The UI 600 also includes a code editing pane 602 and a results section 603 that displays the client name, tenant ID, time generated, the display name of threats, or of queries run, and/or a listing of results, threats detected, and/or classification of threats.

FIG. 7 presents a diagrammatical illustration of the relationship 700 between the threat hunting environment 701 and the various networks and services it may connect to. Because this is a connected and assisted threat-hunting development environment, it may be connected to various SIEMs 702, several tenant networks 703 and various services and micro-services that assist the threat-hunting environment 701. The threat hunting environment 701 leverages the functionalities of SIEMs 702 and services 704 to deal with threats and provide security services to tenant networks 703. The platform 701 may be connected to one or more of any of these 702, 703, and 704 simultaneously if necessary.

FIG. 8 presents a diagram illustrating Dynamic Exception Processing and how it is incorporated by the platform discussed herein. Queries are used on tenant networks via SIEMs to reveal malicious activities and threats. Once written and tested, each search query becomes a valuable asset, used to recognize and diagnose attacks and malicious activities. Queries are highly complex but must be adjusted to for new environments to tune for accuracy. Dynamic Exception Processing changes search query parameters at runtime. While traditional exception processing may require thousands of unique files, DEP requires one. For example, a search query may attempt to identify 801 a specific commuter virus with a specific name. To filter out false-positives, a folder, database, or location may be considered to be an exception 802 to the rest of the search, as part of the command. Of course, this exception becomes problematic when managing security for hundreds of companies. The requirement forces security providers to create a new query for each client, effectively duplicating effort hundreds of times, per rule, to account for a customer-specific data. As a solution to this obstacle, DEP stores 803 a mutable list of exceptions alongside the original query and a function is created to dynamically insert the correct value, based on the tenant network or client that is being searched. The value that is inserted could be related to any relevant field whether it is a folder name, location, and id numbers. When Dynamic Exception Processing is run, for example as is shown in FIG. 4, the threat hunting environment takes the single file storing the mutable list and isolates the query. When the query is run against target environments, the Dynamic exception function is provided with data relevant to the target tenant network, and my run the function based on this target/tenant network customization. This reduces, network load, storage space, and administrative effort, while increasing the security and privacy of customer data.

FIG. 9 is a diagrammatic representation of an example computing system 1, with a host machine 3000, within which a set of instructions for causing the machine to perform any one or more of the methodologies discussed herein may be executed. In various example embodiments, the machine operates as a standalone device or may be connected (e.g., networked) to other machines. In a networked deployment, the host machine 3000 may operate in the capacity of a server or a client machine in a server-client network environment, or as a peer machine in a peer-to-peer (or distributed) network environment. The host machine 3000 may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a host machine 3000, which may be a computing device, running a host operating system (OS) 3001 on a processor or multiple processor(s)/processor core(s) 3003 (e.g., a central processing unit (CPU), a graphics processing unit (GPU), or both), and various memory nodes 3005. Host OS 3001 may include a hypervisor 3004 which is able to control the functions and/or communicate with a virtual machine ("VM") 3010 running on machine readable media. VM 3010 may also include a virtual CPU or vCPU 3009. Memory nodes 3005, and 3007 may be linked or pinned to virtual memory nodes or vNodes 3006 respectively. When a memory node 3005 is linked or pinned to a corresponding virtual node 3006, then data may be mapped directly from the memory nodes 3005 to their corresponding vNodes 3006.

All different components shown in host machine 3000 may be connected with each other or communicate to each other via bus (not shown) or via other coupling mechanisms. The host machine 3000 may further include a video display, audio device or other peripherals 3020 (e.g., a liquid crystal display (LCD), alpha-numeric input device(s) including, e.g., a keyboard, a cursor control device, e.g., a mouse, a voice recognition or biometric verification unit, an external drive, a signal generation device, e.g., a speaker,) a persistent storage device 3002 (also referred to as disk drive unit), and a network interface device 3025. The host machine 3000 may further include a data encryption module (not shown) to encrypt data.

The components provided in the host machine 3000 are those typically found in computer systems that may be suitable for use with embodiments of the present disclosure and are intended to represent a broad category of such computer components that are known in the art. Thus, the computer system 1 can be a server, minicomputer, mainframe computer, or any other computer system. The computer may also include different bus configurations, networked platforms, multi-processor platforms, and the like. Various operating systems may be used including UNIX, LINUX, WINDOWS, QNX ANDROID, IOS, CHROME, TIZEN, and other suitable operating systems.

The disk drive unit 3002 may also be a Solid-state Drive (SSD), a hard disk drive (HDD) or other includes a computer or machine-readable medium on which is stored one or more sets of instructions and data structures (e.g., data or instructions 3015) embodying or utilizing any one or more of the methodologies or functions described herein. The instructions 3015 may also reside, completely or at least partially, within the main memory node 3005 and/or within the processor(s) 3003 during execution thereof by the host machine 3000. The processor(s) 3003, and memory nodes 3005 may also comprise machine-readable media.

The instructions 3015 may further be transmitted or received over a network 3030 via the network interface device 3025 utilizing any one of several well-known transfer protocols (e.g., Hyper Text Transfer Protocol (HTTP)). The term "computer-readable medium" or "machine-readable medium" should be taken to include a single medium or multiple medium (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized to implement any of the embodiments of the disclosure as described herein.

The computer program instructions may also be loaded onto a computer, a server, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 3030 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi@ networking.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the host machine 3000, with each server 3035 (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++, or the like and conventional procedural programming languages, such as the "C" programming language, Go, Python, or other programming languages, including assembly languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

EXAMPLE CLAUSES

Various aspects of the subject matter described herein are set out in the following numbered clauses:

Clause 1: An assisted and networked threat hunting detection and response system, the system comprising: at least one SIEM server connected to at least one tenant network; a SOAR management server connected to the SIEM servers, the SOAR management server with an at least one memory coupled to an at least one processor, where the memory is loaded with instructions, the at least one processor coupled to the at least one memory configured to: execute a threat-hunting environment that, via a dedicated user interface, is configured to: establish data transfer pipelines between the threat-hunting environment and the at least one tenant network, the data transfer pipelines maintaining a connection between the threat-hunting environment and the at least one tenant network during an active session, via the at least one SIEM server, to allow continuous data communication; query the at least one tenant network with a query developed via an integrated code editor; receive the query result data from the at least one tenant network; analyze, the result data for a detected threat in the at least one tenant network; and based on the analyzed result data, push a subsequent query to the at least one tenant network to respond to detected threat.

Clause 2: The system of clause 1, where the threat-hunting environment is further configured to: save the query or the subsequent query for future use and reference.

Clause 3: The system of clause 1, where the threat-hunting environment is further configured to: dynamically recognize functions and tables referenced by the query or the subsequent query to autonomously determine a relevant tenant network or portion of a tenant network from the at least one tenant network; and remove connection requests to endpoints not within the relevant tenant network or portion of a tenant network from the query or subsequent query.

Clause 4: The system of clause 1, where the threat-hunting environment is further configured to: apply a dynamic exception processing to the query or the subsequent query, wherein the dynamic exception processing autonomously adjusts the query or the subsequent query for the at least one tenant network.

Clause 5: The system of clause 4, where the dynamic exception processing comprises: autonomously create a function to dynamically insert a correct value associated with the at least one tenant network from a stored mutable list.

Clause 6: The system of clause 5, where the dynamic exception processing further comprises: isolate the query or the subsequent query; and execute the function with data relevant to the at least one tenant network.

Clause 7: The system of clause 1, where the user interface allows the user to navigate between interfaces that display running the query or the subsequent query, executed on the at least one SIEM server, the at least one tenant network, and the SOAR management server, or any combination thereof.

Claus 8: The system of clause 1, where the threat-hunting environment is further configured to: add data to the query or the subsequent query, during runtime of the query or subsequent query, wherein the data may alter a functionality provided query or the subsequent query.

Claus 9: The system of clause 1, where the adding data comprises: pause execution of the query or the subsequent query; autonomously add data to the query or the subsequent query; and resume the execution of the query or subsequent query.

Clause 10: The system of clause 8, where the data added includes pagination instructions to only return a certain subset of the results to the at least one SOAR management server.

Clause 11: The system of clause 1, where the user interface of the threat-hunting environment includes a display of a history of results, wherein the history of results is interactive.

Clause 12: The system of clause 1, where the integrated code editor is networked, accessible, and usable by multiple connected users.

Clause 13: The system of clause 1, further comprising: networked micro-services, connected to the SOAR management server, and accessible by the threat-hunting environment.

Clause 14: A method for networked threat-hunting, comprising: establishing data transfer pipelines between a threat-hunting environment and at least one tenant network, the data transfer pipelines maintaining a connection between the threat-hunting environment and the at least one tenant network during an active session, via the at least one SIEM server, to allow continuous data communication; querying the at least one tenant network with a query developed via an integrated code editor; receiving the query result data from the at least one tenant network; analyzing, the result data for a detected threat in the at least one tenant network; and based on the analyzed result data, pushing a subsequent query to the at least one tenant network to respond to the detected threat.

Clause 15: The method of clause 14, further comprising: saving the query or the subsequent query for future use and reference.

Clause 16: The method of clause 14, further comprising: dynamically recognizing functions and tables referenced by the query or the subsequent query to autonomously determine a relevant tenant network or portion of a tenant network from the at least one tenant network; and removing connection requests to endpoints not within the relevant tenant network or portion of a tenant network from the query or subsequent query.

Clause 17: The method of clause 14, further comprising: applying a dynamic exception processing to the query or the subsequent query, wherein the dynamic exception processing autonomously adjusts the query or the subsequent query for the at least one tenant network.

Clause 18: The method of clause 17, where the dynamic exception processing comprises: autonomously creating a function to dynamically insert a correct value associated with the at least one tenant network from a stored mutable list.

Clause 19: The method of clause 18, where the dynamic exception processing further comprises: isolating the query or the subsequent query; and executing the function with data relevant to the at least one tenant network.

Clause 20: A non-transitory computer-readable storage medium having embodied thereon a program, the program being executable by a processor to perform a method for providing a networked threat-hunting environment comprising: establishing data transfer pipelines between the threat-hunting environment and at least one tenant network, the data transfer pipelines maintaining a connection between the threat-hunting environment and the at least one tenant network during an active session, via at least one SIEM server, to allow continuous data communication; querying the at least one tenant network with a query developed via an integrated code editor; receiving the query result data from the at least one tenant network; analyzing, the result data for a detected threat in the at least one tenant network; and displaying the result data of the queries in a user interface of the threat-hunting environment, wherein the displaying of the result data includes a history of similar results, wherein the history of similar results is interactive.

The foregoing detailed description includes references to the accompanying drawings, which form a part of the detailed description. The drawings show illustrations in accordance with exemplary embodiments. These example embodiments, which are also referred to herein as "examples," are described in enough detail to enable those skilled in the art to practice the present subject matter.

The various embodiments described above, are presented as examples only, and not as a limitation. The descriptions are not intended to limit the scope of the present technology to the forms set forth herein. To the contrary, the present descriptions are intended to cover such alternatives, modifications, and equivalents as may be included within the spirit and scope of the present technology as appreciated by one of ordinary skill in the art. Thus, the breadth and scope of a preferred embodiment should not be limited by any of the above-described exemplary embodiments.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel or may be performed at different times.

The embodiments can be combined, other embodiments can be utilized, or structural, logical, and electrical changes can be made without departing from the scope of what is claimed. It will be further understood by those within the art that typically a disjunctive word, and/or phrase presenting two or more alternative terms, whether in the description, claims, or drawings, should be understood to contemplate the possibilities of including one of the terms, either of the terms, or both terms unless context dictates otherwise. The detailed description is, therefore, not to be taken in a limiting sense, and the scope is defined by the appended claims and their equivalents. In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference, and the disclosure expressly set forth in the present application controls.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one", and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one", and indefinite articles such as "a" or "an" (e.g., "a", and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A, and B together, A, and C together, B, and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A, and B together, A, and C together, B, and C together, and/or A, B, and C together, etc.).

With respect to the appended claims, those skilled in the art will appreciate that recited operations therein may generally be performed in any order. Also, although claim recitations are presented in a sequence(s), it should be understood that the various operations may be performed in other orders than those which are described, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect,", an embodiment", "one embodiment", "an exemplification," "one exemplification,", and the like means that a particular feature, structure, or characteristic described in connection with the aspect is included in at least one aspect. Thus, appearances of the phrases "in one aspect," "in an aspect," "in an exemplification,", and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Directional phrases used herein, such as, for example, and without limitation, top, bottom, left, right, lower, upper, front, back, and variations thereof, shall relate to the orientation of the elements shown in the accompanying drawing, and are not limiting upon the claims unless otherwise expressly stated.

The terms "about" or "approximately" as used in the present disclosure, unless otherwise specified, means an acceptable error for a particular value as determined by one of ordinary skill in the art, which depends in part on how the value is measured or determined. In certain aspects, the term "about" or "approximately" means within 1, 2, 3, or 4 standard deviations. In certain aspects, the term "about" or "approximately" means within 50%, 200%, 105%, 100%, 9%, 8%, 7%, 6%, 5%, 4%, 3%, 2%, 1%, 0.5%, or 0.05% of a given value or range.

In this specification, unless otherwise indicated, all numerical parameters are to be understood as being prefaced, and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits, and by applying ordinary rounding techniques.

Any numerical range recited herein includes all sub-ranges subsumed within the recited range. For example, a range of "1 to 100" includes all sub-ranges between (and including) the recited minimum value of 1, and the recited maximum value of 100, that is, having a minimum value equal to or greater than 1, and a maximum value equal to or less than 100. Also, all ranges recited herein are inclusive of the end points of the recited ranges. For example, a range of "1 to 100" includes the end points 1, and 100. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

The terms "comprise" (and any form of comprise, such as "comprises", and "comprising"), "have" (and any form of have, such as "has", and "having"), "include" (and any form of include, such as "includes", and "including"), and "contain" (and any form of contain, such as "contains", and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described to best explain the principles of the present technology and its practical application, and to enable others of ordinary skill in the art to understand the invention for various embodiments with various modifications as are suited to the particular use contemplated.

What is claimed is:

1. An assisted and networked threat hunting detection and response system, the system comprising:
at least one Security Information, and Event Management (SIEM) server connected to at least one tenant network;
a Security Orchestration, Automation, and Response (SOAR) management server connected to the SIEM servers, the SOAR management server with at least one memory coupled to at least one processor, where the memory is loaded with instructions, the at least one processor coupled to the at least one memory configured to:
execute a threat-hunting environment that, via a dedicated user interface, is configured to:
establish data transfer pipelines between the threat-hunting environment and the at least one tenant network, the data transfer pipelines maintaining a connection between the threat-hunting environment and the at least one tenant network during an active session, via the at least one SIEM server, to allow continuous data communication;
query the at least one tenant network with a query developed via an integrated code editor;
receive result data for the query from the at least one tenant network;
analyze the result data for a detected threat in the at least one tenant network;
based on the analyzed result data, push a subsequent query to the at least one tenant network to respond to detected threat; and
apply a dynamic exception processing to the query or the subsequent query, where the dynamic exception processing comprises:
autonomously adjusting the query or the subsequent query for the at least one tenant network; and
autonomously creating a function to dynamically insert a correct value associated with the at least one tenant network from a stored mutable list.

2. The system of claim 1, where the threat-hunting environment is further configured to:
save the query or the subsequent query for future use and reference.

3. The system of claim 1, wherein the threat-hunting environment is further configured to:
dynamically recognize functions and tables referenced by the query or the subsequent query to autonomously determine a portion of the tenant network; and
remove, from the query or the subsequent query, connection requests to endpoints not within the portion of the tenant network, preventing establishment of a connection to the endpoints not within the portion of the tenant network.

4. The system of claim 1, where the dynamic exception processing further comprises:
isolating the query or the subsequent query; and
executing the function with data relevant to the at least one tenant network.

5. The system of claim 1, where the user interface allows the user to navigate between interfaces that display running the query or the subsequent query, executed on the at least one SIEM server, the at least one tenant network, and the SOAR management server, or any combination thereof.

6. The system of claim 1, where the threat-hunting environment is further configured to:
add augmenting data to the query or the subsequent query, during runtime of the query or subsequent query, wherein the data may alter a functionality provided query or the subsequent query.

7. The system of claim 6, where the adding of the augmenting data comprises:
pausing execution of the query or the subsequent query;
autonomously adding data to the query or to the subsequent query; and
resuming the execution of the query or subsequent query.

8. The system of claim 1, where the user interface of the threat-hunting environment includes a display of a history of results, wherein the history of results is interactive.

9. The system of claim 1, where the integrated code editor is networked, accessible, and usable by multiple connected users.

10. The system of claim 1, further comprising networked micro-services, connected to the SOAR management server, and accessible by the threat-hunting environment.

11. An assisted and networked threat hunting detection and response system, the system comprising:
at least one Security Information, and Event Management (SIEM) server connected to at least one tenant network;
a Security Orchestration, Automation, and Response (SOAR) management server connected to the SIEM servers, the SOAR management server with at least one memory coupled to at least one processor, where the memory is loaded with instructions, the at least one processor coupled to the at least one memory configured to:
execute a threat-hunting environment that, via a dedicated user interface, is configured to:
establish data transfer pipelines between the threat-hunting environment and the at least one tenant network, the data transfer pipelines maintaining a connection between the threat-hunting environment and the at least one tenant network during an active session, via the at least one SIEM server, to allow continuous data communication;
query the at least one tenant network with a query developed via an integrated code editor;
receive result data for the query from the at least one tenant network;
analyze the result data for a detected threat in the at least one tenant network;
based on the analyzed result data, push a subsequent query to the at least one tenant network to respond to detected threat;
apply a dynamic exception processing to the query or the subsequent query, wherein the dynamic exception processing comprises autonomously adjusting the query or the subsequent query for the at least one tenant network; and
add augmenting data to the query or the subsequent query, during runtime of the query or subsequent query, wherein the data may alter a functionality provided query or the subsequent query, and wherein the data added includes pagination instructions to only return a certain subset of the results to the at least one SOAR management server.

12. A method for networked threat-hunting, comprising:
establishing data transfer pipelines between a threat-hunting environment and at least one tenant network, the data transfer pipelines maintaining a connection between the threat-hunting environment and the at least one tenant network during an active session, via at least one Security Information, and Event Management (SIEM) server, to allow continuous data communication;

querying the at least one tenant network with a query developed via an integrated code editor;

receiving result data for the query from the at least one tenant network;

analyzing the result data for a detected threat in the at least one tenant network;

based on the analyzed result data, pushing a subsequent query to the at least one tenant network to respond to the detected threat; and applying a dynamic exception processing to the query or the subsequent query, where the dynamic exception processing comprises:

autonomously adjusting the query or the subsequent query for the at least one tenant network; and autonomously creating a function to dynamically insert a correct value associated with the at least one tenant network from a stored mutable list.

13. The method of claim 12, further comprising:

saving the query or the subsequent query for future use and reference.

14. The method of claim 12, further comprising:

dynamically recognizing functions and tables referenced by the query or the subsequent query to autonomously determine a portion of the tenant network; and removing, from the query or the subsequent query, connection requests to endpoints not within the portion of the tenant network, preventing establishment of a connection to the endpoints not within the portion of the tenant network.

15. The method of claim 12, where the dynamic exception processing further comprises:

isolating the query or the subsequent query; and executing the function with data relevant to the at least one tenant network.

* * * * *